United States Patent
Park

(10) Patent No.: US 10,473,294 B2
(45) Date of Patent: Nov. 12, 2019

(54) LIGHTING APPARATUS FOR VEHICLE

(71) Applicant: LG ELECTRONICS INC., Seoul (KR)

(72) Inventor: Jun Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/639,326

(22) Filed: Jun. 30, 2017

(65) Prior Publication Data

US 2018/0003357 A1    Jan. 4, 2018

(30) Foreign Application Priority Data

Jul. 4, 2016 (KR) .................. 10-2016-0084323

(51) Int. Cl.
*F21V 9/30* (2018.01)
*F21S 41/25* (2018.01)
(Continued)

(52) U.S. Cl.
CPC .............. *F21V 9/30* (2018.02); *B60Q 1/14* (2013.01); *F21S 41/14* (2018.01); *F21S 41/143* (2018.01);
(Continued)

(58) Field of Classification Search
CPC ... F21V 9/30; F21S 41/67; F21S 41/25; F21S 41/663; F21S 41/14; F21S 41/16;
(Continued)

(56) References Cited

U.S. PATENT DOCUMENTS

| 2011/0216550 A1 | 9/2011 | Koike et al. |
| 2012/0057364 A1 | 3/2012 | Kishimoto et al. |

(Continued)

FOREIGN PATENT DOCUMENTS

| CN | 103969934 | 8/2014 |
| JP | 2015041475 | 3/2015 |

(Continued)

OTHER PUBLICATIONS

Extended European Search Report in European Application No. 17179521.4, dated Dec. 7, 2017, 7 pages.

(Continued)

*Primary Examiner* — Anh T Mai
*Assistant Examiner* — Jessica M Apenteng
(74) *Attorney, Agent, or Firm* — Fish & Richardson P.C.

(57) ABSTRACT

A lighting apparatus for a vehicle includes a lens and a light source device disposed behind the lens. The lighting apparatus also includes a phosphor assembly configured to convert a wavelength of an incident beam and to emit light having the converted wavelength toward the lens. The phosphor assembly includes a phosphor configured to emit the light having the converted wavelength of the incident beam; and a reflector including a plurality of reflective guide walls configured to reflect the light having the converted wavelength emitted by the phosphor. The reflector that includes the plurality of reflective guide walls defines at least one space through which the light having the converted wavelength emitted by the phosphor is guided by the plurality of reflective guide walls.

20 Claims, 13 Drawing Sheets

(51) Int. Cl.
  *F21S 41/20* (2018.01)
  *F21S 45/47* (2018.01)
  *F21S 41/36* (2018.01)
  *F21S 41/67* (2018.01)
  *F21S 41/663* (2018.01)
  *B60Q 1/14* (2006.01)
  *F21S 41/14* (2018.01)
  *F21S 41/143* (2018.01)
  *F21S 41/255* (2018.01)
  *F21S 41/32* (2018.01)
  *F21S 41/16* (2018.01)
  *F21S 41/365* (2018.01)

(52) U.S. Cl.
  CPC ............... *F21S 41/16* (2018.01); *F21S 41/25* (2018.01); *F21S 41/255* (2018.01); *F21S 41/285* (2018.01); *F21S 41/32* (2018.01); *F21S 41/36* (2018.01); *F21S 41/663* (2018.01); *F21S 41/67* (2018.01); *F21S 45/47* (2018.01); *F21S 41/365* (2018.01)

(58) Field of Classification Search
  CPC ........ F21S 41/36; F21S 41/143; F21S 41/255; B60Q 1/14
  USPC .......................................................... 362/464
  See application file for complete search history.

(56) References Cited

U.S. PATENT DOCUMENTS

| | | | |
|---|---|---|---|
| 2012/0206931 | A1 | 8/2012 | Nakazato et al. |
| 2014/0369064 | A1* | 12/2014 | Sakaue ............. G02B 27/0994 362/553 |
| 2015/0049457 | A1 | 2/2015 | Kroell |
| 2015/0175054 | A1 | 6/2015 | Yatsuda et al. |
| 2015/0357790 | A1* | 12/2015 | Jeoung ..................... F21V 5/04 372/32 |

FOREIGN PATENT DOCUMENTS

| | | |
|---|---|---|
| KR | 10-2010-0122645 | 11/2010 |
| KR | 101489208 | 2/2015 |
| KR | 10-2015-0119922 | 10/2015 |
| KR | 10-2016-0018024 | 2/2016 |
| WO | 2017121707 | 8/2014 |
| WO | 2014192338 | 12/2014 |

OTHER PUBLICATIONS

Chinese Office Action in Chinese Application No. 201710159478.2, dated Jul. 2, 2019, 17 pages (with English Translation).

* cited by examiner

LIGHTING APPARATUS FOR VEHICLE

CROSS-REFERENCE TO RELATED APPLICATIONS

The present application claims the benefit of an earlier filing date and right of priority under 35 U.S.C. 119 and 35 U.S.C. 365 to Korean Patent Application No. 10-2016-0084323, filed on Jul. 4, 2016, the content of which is hereby incorporated by reference in its entirety.

TECHNICAL FIELD

The present disclosure relates to a lighting apparatus for a vehicle.

BACKGROUND

A lighting apparatus, such as a lamp, is typically installed in a vehicle. Such a lighting apparatus for a vehicle is typically designed to assist a driver to secure a field of vision by increasing surrounding illumination intensity, or to notify people outside the vehicle regarding a current driving state of the vehicle.

In particular, common lighting apparatuses for a vehicle include a head lamp which emits light toward the front of the vehicle, and a rear lamp which is mounted at the rear of the vehicle to indicate the direction of travel of the vehicle or to notify the operation or non-operation of a braking operation of the vehicle.

SUMMARY

Implementations described herein provide a lighting apparatus for a vehicle implementing a phosphor assembly that may be configured to perform wavelength conversion for light that is emitted from the front of the vehicle.

In one aspect, a lighting apparatus for a vehicle may include a lens and a light source device disposed behind the lens. The lighting apparatus may also include a phosphor assembly configured to convert a wavelength of an incident beam and to emit light having the converted wavelength toward the lens. The phosphor assembly may include a phosphor configured to emit the light having the converted wavelength of the incident beam. The phosphor assembly may also include a reflector including a plurality of reflective guide walls configured to reflect the light having the converted wavelength emitted by the phosphor. The reflector that includes the plurality of reflective guide walls may define at least one space through which the light having the converted wavelength emitted by the phosphor is guided by the plurality of reflective guide walls.

In some implementations, at least a portion of the phosphor may be provided in the at least one space defined by the reflector that includes the plurality of reflective guide walls.

In some implementations, the reflector may be provided on a light exit surface of the phosphor.

In some implementations, the reflector may be disposed at a position between the phosphor and the lens.

In some implementations, a thickness of the reflector may be greater than a thickness of the phosphor.

In some implementations, a side surface of the plurality of reflective guide walls may be perpendicular to a light exit surface of the phosphor.

In some implementations, a side surface of the plurality of reflective guide walls and a light exit surface of the phosphor may form an obtuse angle.

In some implementations, a cross-sectional area of the at least one space defined by the reflector may be greater than a cross-sectional area of the beam incident on the phosphor assembly.

In some implementations, the light source device may include: a light source unit including a light source; and a scanning module configured to redirect an optical path of a beam emitted by the light source unit. The scanning module may include: a scanning unit configured to redirect the optical path by reflecting an incident beam while performing scanning movements according to a predetermined frequency; and a light concentration unit configured to concentrate the beam emitted by the light source unit and to input the beam into the scanning unit.

In some implementations, the lighting apparatus may further include: an external sensor configured to sense external information outside the vehicle; and a control unit configured to control the light source based on the external information.

In some implementations, the control unit may be configured to: turn off the light source based on the beam that is incident on the phosphor assembly being incident on a top surface of the plurality of reflective guide walls; and turn on the light source based on the beam that is incident on the phosphor assembly being incident on the phosphor of the phosphor assembly.

In some implementations, the phosphor may be a reflective phosphor in which a light entrance surface is identical to a light exit surface.

In some implementations, a reflection unit may be provided on a partial region of a front surface of the lens. The reflection unit may be configured to reflect, toward the phosphor assembly, the beam emitted by the light source unit, and the phosphor assembly may be disposed behind the lens.

In some implementations, a cross-section of the at least one space defined by the reflector may have a rectangular shape.

In some implementations, an anti-reflection film may be formed on a top surface of the plurality of reflective guide walls.

In some implementations, the reflector may be disposed at a position that is spaced apart from the phosphor.

In some implementations, the reflector may include: a plurality of first reflective guide walls elongated in a first direction; and a plurality of second reflective guide walls elongated in a second direction perpendicular to the first direction.

In some implementations, one first reflective guide wall among the plurality of first reflective guide walls may be disposed in parallel to another first reflective guide wall among the plurality of first reflective guide walls. One second reflective guide wall among the plurality of second reflective guide walls may be disposed in parallel to another second reflective guide wall among the plurality of second reflective guide walls.

In some implementations, one first reflective guide wall among the plurality of first reflective guide walls may be disposed to be spaced apart from another first reflective guide wall that is adjacent to the one first reflective guide wall by a first spacing interval. One second reflective guide wall among the plurality of second reflective guide walls may be disposed to be spaced apart from another second reflective guide wall adjacent to the one second reflective guide wall by a second spacing interval.

In some implementations, a width of the first spacing interval may be greater than a maximum width, in the first direction, of a cross-section of the beam that is incident on the phosphor assembly. The second spacing interval may be greater than a maximum width, in the second direction, of the cross-section of the beam that is incident on the phosphor assembly.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims.

DETAILED DESCRIPTION

A lighting apparatus for the vehicle may form a low beam or a high beam so as to ensure a driver's field of vision, for example during nighttime driving. Technologies for lighting apparatuses include light-emitting diodes (LEDs) having high power efficiency and a longer lifespan, and laser diodes having a long irradiation distance.

Laser diodes typically have a strong output, and may result in safety concerns if a laser beam is directly emitted to an outside of the vehicle without undergoing wavelength conversion. To mitigate such problems, a lighting apparatus may be configured to output white-based light by performing wavelength conversion on a laser beam, for example by using a phosphor.

In a lighting apparatus for a vehicle that is implemented using a phosphor, undesirable effects, such as the appearance of a yellow ring, may occur during a wavelength conversion process performed after a beam is incident on the phosphor, thus deteriorating color purity.

According to implementations described herein, a lighting apparatus includes a phosphor assembly that includes a phosphor that performs wavelength conversion, and also a reflector with reflective guide walls to guide the wavelength-converted light. As such, light that is emitted by the phosphor is integrated in a space formed by the reflective guide walls of the reflector. In such implementations, the reflector may help mitigate occurrence of a yellow ring formed by yellow-based light.

Hereinafter, some examples of specific implementations will be described in detail with reference to the accompanying drawings.

Figure 1:
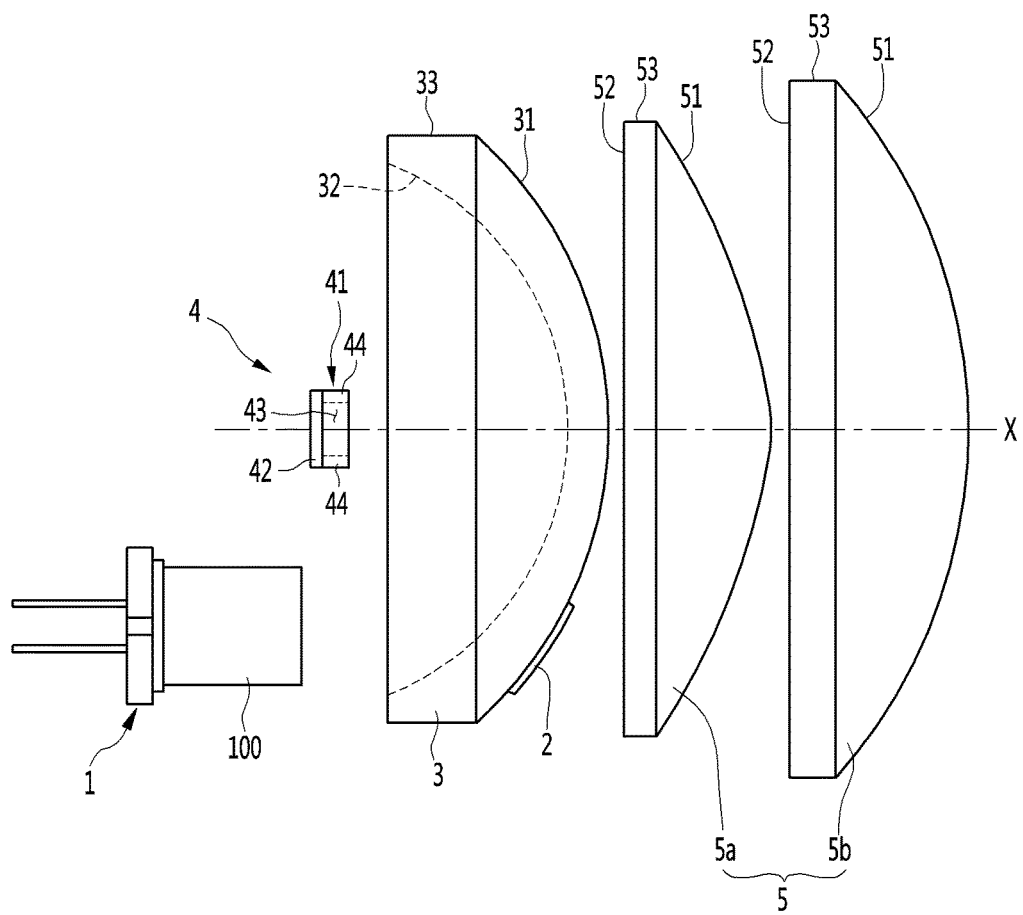
FIG. 1 is a diagram illustrating an example of a lighting apparatus for a vehicle according to a first implementation.
Figure 2:
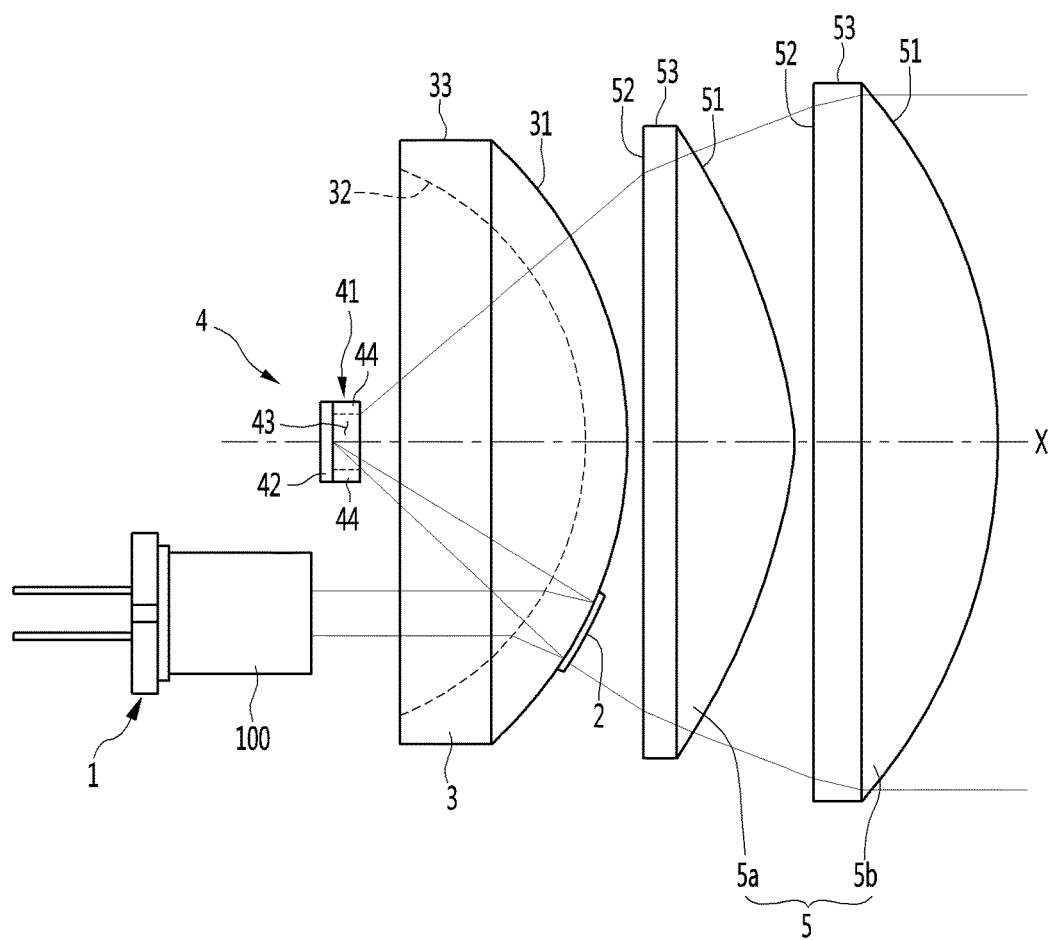
FIG. 2 is a diagram illustrating an example of an optical path of the lighting apparatus for the vehicle according to the first implementation.

FIG. 1 is a configuration diagram schematically illustrating a lighting apparatus for a vehicle according to a first implementation, and FIG. 2 is a configuration diagram schematically illustrating an optical path of the lighting apparatus for the vehicle according to the first implementation.

Referring to FIGS. 1 and 2, the lighting apparatus for the vehicle may include a lens 3, a light source device 1 which is disposed behind the lens 3, and a phosphor assembly 4 which converts a wavelength of incident light and emits the wavelength-converted light to the lens 3.

The lighting apparatus for the vehicle may constitute a head lamp of the vehicle, and may be used as a high beam lighting apparatus which generates a high beam or a low beam lighting apparatus which generates a low beam.

According to the first implementation, the light source device 1 may emit a beam toward a reflection unit 2. The light source device 1 may emit a beam toward the lens 3. The beam emitted toward the lens 3 may pass through the lens 3 and be then incident on the reflection unit 2.

The light source device 1 may emit a beam toward a rear surface 32 of the lens 3, and the beam incident on the rear surface 32 of the lens 3 by the light source device 1 may pass through the lens 3 and be then incident on the reflection unit 2.

The light source device 1 may include a light source 100. The light source 100 may receive electrical energy and convert the electrical energy into optical energy, and may be a light-emitting source, such as an ultra high voltage (UHV) mercury lamp, a light-emitting diode (LED), or a laser diode (LD).

It is preferable that the light source 100 has excellent straightness and high efficiency and enables long-distance irradiation. The light source 100 is preferably a laser diode. It is preferable that the laser diode used as the light source 100 emits a blue-based laser beam having high efficiency. Since the laser beam has a very strong straightness, the beam emitted by the light source 100 may be mitigated from scattering and mitigated from expansion of beam diameter.

In some implementations, a heat dissipation member may be connected to the light source 100 so as to dissipate heat generated by the light source 100. The heat dissipation member may include a contact plate which comes into contact with the light source 100, and a heat dissipation fin which protrudes from the contact plate.

In some implementations, the light source device 1 may further include a reducer which reduces a diameter of a beam emitted by the light source 100 and then emits the beam toward the reflection unit 2.

Additionally, the light source device 1 may further include a reflection member 11 and a scanning module 8 which changes and redirects an optical path of the beam emitted by the light source 100. Details thereof will be described below.

In a case where the light source device 1 includes both the light source 100 and the reducer, the beam emitted by the light source 100 may pass through the reducer and be then emitted toward the reflection unit 2. In a case where the light source device 1 includes the light source 100 and does not include the reducer, the beam emitted by the light source 100 may be emitted toward the reflection unit 2.

The case where the light source device 1 includes the light source 100 and does not include the reducer will be described below, but it is apparent that the scope of the present implementation is not limited thereto.

Hereinafter, the lens 3 will be described in further detail.

The lens 3 may be formed to be larger than the phosphor assembly 4 and the reflection unit 2, and may protect the phosphor assembly 4 and the reflection unit 2 in front of the phosphor assembly 4.

The lens 3 may include a front surface 31 and a rear surface 32. The lens 3 may further include a peripheral surface 33 according to a shape of the lens 3. The front of the lens 3 may refer to a front of the front surface 31 of the lens 3, and the rear of the lens 3 may refer to a rear of the rear surface 32 of the lens 3.

The lens 3 may be a meniscus lens in which the front surface 31 and the rear surface 32 of the lens 3 have a curvature in the same direction.

The front surface 31 of the lens 3 may be convex, and the rear surface 32 of the lens 3 may be concave. More specifically, the front surface 31 of the lens 3 may be a curved surface convex toward the front, and the rear surface 32 of the lens 3 may be a curved surface recessed toward the front. At this time, an inner region of the recessed curved surface, which is the rear surface 32 of the lens 3, may also refer to the rear of the lens 3.

If the rear surface 32 of the lens 3 is a concavely curved surface, this may result in reduction of an incidence angle at which light reflected from the reflection unit 2 is incident on the rear surface 32 of the lens 3. Therefore, there is an effect that reduces optical loss caused by reflection occurring on the rear surface 32 of the lens 3. Additionally, this may result in reduction of an incidence angle at which light reflected from the reflection unit 2 and passing through the rear surface 32 of the lens 3 is incident on the phosphor assembly 4, thereby increasing optical efficiency.

The front surface 31 and/or the rear surface 32 of the lens 3 may be an aspherical surface.

The rear surface 32 of the lens 3 may be a spherical surface having the same curvature in an entire region thereof. As compared to the aspherical surface, the spherical surface is easy to manufacture, is inexpensive, and may improve sensitivity to a position where light reaches the lens 3.

The curvature of the rear surface 32 of the lens 3 may be a curvature where the light reflected from the reflection unit 2 passes through the rear surface 32 of the lens 3.

In a case where the reflection unit 2 is provided on the front surface 31 of the lens 3, a beam reflected from the reflection unit 2 may pass through the rear surface 32 of the lens 3 and reach the phosphor assembly 4. At this time, a part of the beam reflected from the reflection unit 2 may not pass through the rear surface 32 of the lens 3 and may be reflected from the rear surface 32 of the lens 3.

In this case, a blue-based beam, whose wavelength is not converted in the phosphor assembly 4, may be emitted toward the front of the lighting apparatus for the vehicle, and thus, it is feared that a person's eyes will be damaged or a person's eyesight will be damaged. Additionally, the beam reflected from the reflection unit 2 may be reflected from the rear surface 32 of the lens 3, causing optical loss.

Therefore, it is preferable that the curvature of the rear surface 32 of the lens 3 is a curvature where the light reflected from the reflection unit 2 passes through the rear surface 32 of the lens 3 so as to reduce the optical loss.

As an example, the curvature of the rear surface 32 of the lens 3 may be a curvature where the incidence angle at which the beam reflected from the reflection unit 2 is incident on the rear surface 32 of the lens 3 is 0 degree. As such, refraction is mitigated when the beam reflected from the reflection unit 2 passes through the rear surface 32 of the lens 3. Additionally, when the beam reflected from the reflection unit 2 passes through the rear surface 32 of the lens 3, the reflection occurring on the rear surface 32 of the lens 3 may be reduced. Even though the reflection occurs on the rear surface 32 of the lens 3, the reflected beam may be reflected again from the reflection unit 2 so that the reflected beam is not emitted toward the front of the lens 3.

The lens 3 may have an optical axis X. The optical axis X of the lens 3 may be a rotational symmetry axis or a central axis of the lens 3. The optical axis X of the lens 3 may refer to a straight line passing through the center of the front surface 31 of the lens 3 and the center of the rear surface 32 of the lens 3.

The light source 100 may emit light in a direction parallel to the optical axis X of the lens 3.

On the other hand, the front surface 31 of the lens 3 may be a curved surface convex toward the front, and the rear surface 32 of the lens 3 may be a flat surface. The reflection unit 2 may be attached to the front surface 31 of the lens 3.

Hereinafter, a projection lens 5 will be described in further detail.

The lighting apparatus for the vehicle may further include the projection lens 5 disposed in front of the lens 3 so as to concentrate light emitted from the front surface 31 of the lens 3.

The projection lens 5 may be formed to be larger than the lens 3.

An optical axis of the projection lens 5 may coincide with the optical axis X of the lens 3.

The projection lens 5 may include a plurality of projection lenses 5a and 5b, whose optical axes coincide with each other. Such a configuration may, in some implementations, improve the light concentration effect.

However, when the rear surface 32 of the lens 3 is a flat surface, the inside of the rear surface 32 of the lens 3 may not be empty unlike the meniscus lens. Therefore, the optical loss occurring in an air layer of the lens 3 may be reduced to relatively increase optical power, and only one projection lens 5 may be provided.

In order to concentrate scattered light, the second projection lens 5b disposed far away from the lens 3 may be formed to be larger in diameter than the first projection lens 5a disposed close to the lens 3.

The projection lens 5 may include a front surface 51, a rear surface 52, and a peripheral surface 53. The front surface 51 of the projection lens 5 may be a curved surface convex toward the front. The rear surface 52 of the projection lens 5 may be a flat surface.

In some implementations, the lighting apparatus for the vehicle may further include a lens holder which supports the lens 3 and the projection lens 5.

Hereinafter, the reflection unit 2 will be described in further detail.

The reflection unit 2 may be provided in a partial region of the surface of the lens 3 to reflect the beam emitted by the light source device 1 toward the phosphor assembly 4.

For example, the reflection unit 2 may be provided in the lens 3 such that the reflection unit 2 is integrated with the lens 3. On the other hand, the reflection unit 2 may be provided separately from the lens 3 such that the reflection unit 2 is spaced apart from the lens 3.

As an example, a position of reflection unit 2 may be determined according to an arrangement position of the phosphor assembly 4. In a case where the phosphor assembly 4 is disposed behind the lens 3, the reflection unit 2 may be disposed spaced apart from the lens 3 in the rear of the lens 3, may be provided on the rear surface 32 of the lens 3, may be provided on the front surface 31 of the lens 3, or may be disposed spaced apart from the lens 3 in front of the lens 3.

The reflection unit 2 may reflect the beam emitted by the light source device 1 toward the phosphor assembly 4 in a state in which the reflection unit 2 is spaced apart from the lens 3 in the rear of the lens 3.

In a case where the lens 3 is the meniscus lens, the reflection unit 2 may reflect the beam emitted by the light source device 1 toward the phosphor assembly 4 in a state in which the reflection unit 2 is provided on the rear surface 32 of the lens 3 such that the reflection unit 2 is integrated with the lens 3.

The reflection unit 2 may reflect the beam emitted by the light source device 1 and passing through the lens 3 in a state in which the reflection unit 2 is provided on the front surface 31 of the lens 3 such that the reflection unit 2 is integrated with the lens 3. The beam reflected from the reflection unit 2 may pass through the lens 3 again and be incident on the phosphor assembly 4.

The reflection unit 2 may reflect the beam emitted by the light source device 1 and passing through the lens 3 in a state in which the reflection unit 2 is spaced apart from the lens 3 in front of the lens 3. The beam reflected from the reflection unit 2 may pass through the lens 3 again and be incident on the phosphor assembly 4.

In a case where the reflection unit 2 is spaced apart from the lens 3 behind or in front of the lens 3, the number of components of the lighting apparatus for the vehicle may increase, and the size of the lighting apparatus for the vehicle may increase due to a spacing distance between the lens 3 and the reflection unit 2.

The reflection unit 2 may be integrally provided on the rear surface 32 or the front surface 31 of the lens 3 so as to minimize the number of components of the lighting apparatus for the vehicle and make the lighting apparatus for the vehicle compact.

In a case where the reflection unit 2 is provided on the entire rear surface 32 of the lens 3 or the entire front surface 31 of the lens 3, the reflected light whose waveform is converted in the phosphor assembly 4 may be all reflected toward the rear. That is, the light, whose wavelength is converted in the phosphor assembly 4, may not be emitted toward the front of the lens 3.

Therefore, in some implementations, it is preferable that the reflection unit 2 is provided on a part of the rear surface 32 of the lens 3 or a part of the front surface 31 of the lens 3. It is preferable that the reflection unit 2 is so large as to secure a sufficient light emission region.

It is preferable that the reflection unit 2 is disposed on an off-axis deviated from the optical axis X of the lens 3, and it is preferable that the reflection unit 2 is disposed between the optical axis X of the lens 3 and the peripheral surface 33 of the lens 3.

The reflection unit 2 may reflect the incident beam toward the rear of the lens 3.

It is preferable that the arrangement position of the reflection unit 2 is determined by taking into account the position relationship between the phosphor assembly 4 and the lens 3 and the curvature of the surface of the lens 3 to which the reflection unit 2 is attached.

In the present implementation, the reflection unit 2 may be provided in a partial region of the front surface 31 of the lens 3, or may be disposed behind the lens 3. The beam emitted by the light source device 1 may pass through the rear surface 32 of the lens 3 and reach the reflection unit 2. The beam reflected from the reflection unit 2 may pass through the rear surface 32 of the lens 3 again and be incident on the phosphor assembly 4.

As an example, the reflection unit 2 may be provided in a partial region of the front surface of the lens 3, and the beam emitted by the light source device 1 may pass through the lens 3 and be incident on the reflection unit 2. The beam reflected from the reflection unit 2 may pass through the lens 3 and be incident on the phosphor assembly 4. The light, whose wavelength is converted by the phosphor assembly 4, may pass through the lens 3 and be emitted toward the front.

In a case where the reflection unit 2 is attached to the front surface 31 of the lens 3, light may pass through the lens 3 three times. More specifically, the beam emitted by the light source device 1 passes through the lens 3 and is incident on the reflection unit 2, and the beam reflected from the reflection unit 2 passes through the lens 3 and is incident on the phosphor assembly 4. Then, the reflected light, whose wavelength is converted in the phosphor assembly 4, passes through the lens 3 and is emitted toward the front of the lens 3.

Therefore, the main lens 3 may be a 3-path lens through which light passes three times, and the lighting apparatus for the vehicle may be made compact by the 3-path lens.

In a case where the lens 3 is a 3-path lens, the beam emitted by the light source device 1 may not be emitted toward the front of the lens 3 until the beam reaches the phosphor assembly 4.

Therefore, in some implementations, a separate optical component for inputting a beam to the phosphor assembly 4 may be unnecessary at the front spaced apart from the lens 3, thereby facilitating the arrangement of optical components.

As such, the lighting apparatus for the vehicle may be easy to manufacture, the replacement or design modification of the light source device 1 may be facilitated, and additional optical devices may be easily further provided in the light source device 1.

Additionally, since a separate optical component for inputting the beam to the phosphor assembly 4 is unnecessary at the front spaced apart from the lens 3, the lens 3 and the projection lens 5 may be disposed in a short distance, thereby increasing the optical efficiency and the light concentration effect of the projection lens 5.

The reflection unit 2 may be formed in a part of the convex front surface 31 of the lens 3 along the convex front surface 31 of the lens 3, and may be formed to have an arc-shaped cross-section. When viewed from the front of the lens 3, the reflection unit 2 may have a circular or polygonal shape.

The reflection unit 2 may be a concave mirror formed on the front surface 31 of the lens 3.

The reflection unit 2 may have a convex front surface and a concave rear surface.

The front surface of the reflection unit 2 may face the projection lens 5, and the reflection unit 2 may be disposed between the lens 3 and the projection lens 5 and be protected by the lens 3 and the projection lens 5.

The reflection unit 2 may be a coating layer coated at an off-axis position deviated from the optical axis X of the lens on the front surface 31 of the lens 3. Alternatively, the reflection unit 2 may be a reflection sheet attached to the off-axis position deviated from the optical axis X of the lens 3 on the front surface 31 of the lens 3.

Hereinafter, the phosphor assembly 4 will be described in further detail.

The phosphor assembly 4 may be disposed behind the lens 3, and may convert the wavelength of the beam reflected from the reflection unit 2 and emit the wavelength-converted light toward the lens 3.

Since the phosphor assembly 4 may generate heat during the wavelength conversion of the light, it is preferable that the phosphor assembly 4 is disposed spaced apart from the lens 3. The phosphor assembly 4 may be disposed spaced apart from the lens 3 behind the lens 3.

The phosphor assembly 4 may be disposed to face the rear surface 32 of the lens 3 and emit light toward the rear surface 32 of the lens 3.

The phosphor assembly 4 may be disposed spaced apart from the rear surface 32 of the lens 3 on the optical axis X of the lens 3.

The phosphor assembly 4 may be disposed to be eccentric with respect to the optical axis X of the lens 3.

However, in this case, the efficiency is low because a region of the lens 3 through which the light emitted by phosphor assembly 4 passes is smaller than in a case where the phosphor assembly 4 is disposed on the optical axis X of the lens 3. That is, it is preferable that the phosphor assembly 4 is disposed on the optical axis X of the lens 3.

Additionally, by implementing the phosphor assembly 4 disposed on the optical axis X of the lens 3, implementations described herein may improve the process of assembly during the manufacturing of the lighting apparatus for the vehicle.

More specifically, if the phosphor assembly 4 is not disposed on the optical axis X of the lens 3, then it may be necessary to set accurate relative positions of the phosphor assembly 4 and the lens 3 and assemble the phosphor assembly 4 and the lens 3 at the accurate relative positions, so that the beam emitted by the light source 100 reaches the phosphor assembly 4. Thus, this assembling may be difficult.

On the other hand, in a case where the phosphor assembly 4 is disposed on the optical axis X of the lens 3, the optical axis X of the lens 3 may coincide with the central axis of the lens 3. Thus, in some implementations, it may only be necessary to perform assembling such that the phosphor assembly 4 is disposed on the central axis of the lens 3. As such, in some scenarios, implementations described herein may provide an advantage in that the assembly is relatively simple.

Figure 3:
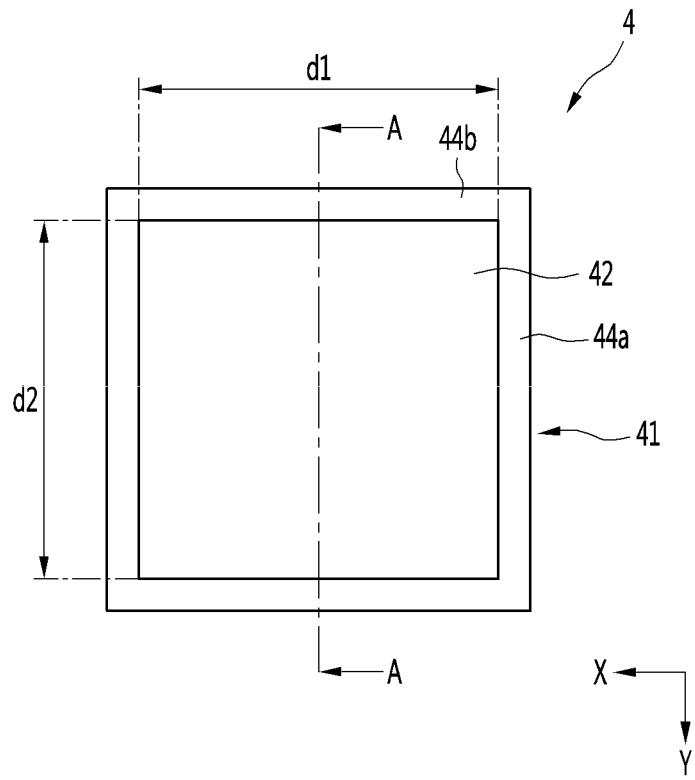
FIG. 3 is a diagram illustrating a front-view of an example of a phosphor assembly according to the first implementation.
Figure 4:
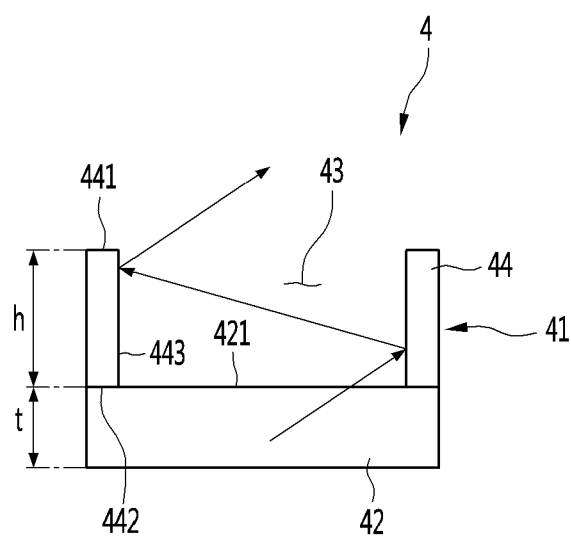
FIG. 4 is a diagram illustrating a cross-sectional view of an example of the phosphor assembly taken along line A-A of FIG. 3 and an example of a path of light emitted by the phosphor assembly.

FIG. 3 is a front view schematically illustrating the phosphor assembly according to the first implementation, and FIG. 4 is a cross-sectional view illustrating the phosphor assembly taken along line A-A of FIG. 3 and a path of light emitted by the phosphor assembly.

Referring to FIGS. 3 and 4, the phosphor assembly 4 may include a phosphor 42 which converts a wavelength of an incident beam and emits the resulting wavelength-converted beam. The phosphor assembly 4 may also include a reflector 41 including a plurality of reflective guide walls 44 which reflect light emitted by the phosphor 42. The reflector 41 may form at least one space 43 through which the light emitted by the phosphor 42 is guided by the reflective guide walls 44.

Hereinafter, the phosphor 42 will be described in further detail.

The phosphor 42 may be configured to convert the wavelength of the incident beam. For example, when a blue-based laser beam is incident on the phosphor 42, the phosphor 42 may perform a wavelength conversion on a part of the incident beam to generate yellow-based light, and emit the generated yellow-based light toward a light exit surface 421 of the phosphor 42.

In some implementations, the phosphor 42 may be a transmissive phosphor. In the transmissive phosphor, a light entrance surface is different from a light exit surface. More specifically, when the blue-based beam is incident on one surface of the transmissive phosphor, the wavelength-converted yellow-based light and the wavelength-unconverted blue-based light may be emitted toward the other surface which is opposite to the one surface.

As an alternative, in some implementations, the phosphor 42 may be a reflective phosphor. In the reflective phosphor, a light entrance surface is identical to a light exit surface. More specifically, when the blue-based beam is incident on one surface of the reflective phosphor, the wavelength-converted yellow-based light and the wavelength-unconverted blue-based light may be reflected from the other surface which is opposite to the one surface, and may be then emitted back toward the one surface on which the light was incident.

Hereinafter, an example where the phosphor 42 is the reflective phosphor will be described. However, the configuration of the phosphor assembly 4 according to this implementation may also be applied to a case where the phosphor 42 is a transmissive phosphor.

The phosphor 42 may include a reflection layer which reflects the light, and a wavelength conversion layer which converts the wavelength of the light.

The wavelength conversion layer may be disposed toward the front of the lighting apparatus, and the reflection layer may be disposed behind the wavelength conversion layer.

The wavelength conversion layer may be a wavelength conversion film and may include an opto ceramic. The wavelength conversion layer may convert the wavelength of the beam reflected from the reflection unit 2 in a state of being disposed in front of the reflection layer.

The wavelength conversion layer be a wavelength conversion film which, when a blue-based beam is incident from the outside, converts the blue-based beam into yellow-based light. The wavelength conversion layer may include a yellow opto ceramic.

The reflection layer may include a plate, and a reflective coating layer coated on an outer surface of the plate. The plate may be made of a metal.

The reflection layer may support the wavelength conversion layer, and the light passing through the wavelength conversion layer may be reflected toward the rear surface of the lens 3 by the reflection layer.

When the blue-based beam is reflected, by the reflection unit 2, toward the phosphor assembly 4 and is incident on the phosphor 42, the blue-based beam incident into the wavelength conversion layer may be scattered and excited in the wavelength conversion layer. A part of the blue-based light may be wavelength-converted into the yellow-based light, and a part of the blue-based light may not be wavelength-converted. The conversion ratio may be changed according to a material of the phosphor 42 or a yag inclusion ratio.

The blue-based light and the yellow-based light inside the wavelength conversion layer may be reflected, by the reflection layer, toward the front of the wavelength conversion layer, that is, the light exit surface 421 of the phosphor 42.

Since the blue-based light and the yellow-based light are integrated with each other, white-based light may be emitted toward the front of the phosphor assembly 4. The white-based light may pass through the lens 3 and be then emitted toward the front of the lens 3.

Unlike a laser beam having straightness, the white-based light emitted toward the front by the phosphor assembly 4 may be radially scattered toward the front. The lens 3 disposed in front of the phosphor assembly 4 and the projection lens 5 disposed in front of the lens 3 may serve to concentrate the scattered white-based light.

However, while the light is scattered in the wavelength conversion layer of the phosphor 42, there may be a region where the blue-based light is not integrated with the yellow-based light due to a difference of scattering areas. Due to this, a yellow ring may be generated around the white-based light by the non-integrated yellow-based light.

The yellow ring may cause a problem that may deteriorate color purity of light emitted toward the front of the lighting apparatus for the vehicle.

In some implementations, to mitigate the occurrence of the yellow ring, the phosphor assembly 4 according to the present implementation may include the reflector 41. Details thereof will be described below.

Hereinafter, the reflector 41 will be described in further detail.

The reflector 41 may include a plurality of reflective guide walls 44 configured to reflect the light emitted by the phosphor 42. The reflective guide walls 44 may form at least one space 43 through which the light emitted by the phosphor 42 passes as a result of being guided by the reflective guide walls 44.

The reflector 41 may be disposed between the phosphor 42 and the lens 3. As an example, the lens 3 may be disposed in front of the reflector 41, and the phosphor 42 may be disposed behind the reflector 41.

The reflector 41 may be formed by individually manufacturing the plurality of reflective guide walls 44 and assembling the individual reflective guide walls 44, or may be formed by integrally forming the plurality of reflective guide walls 44.

The reflective guide wall 44 may be made of a material configured to reflect light, and a reflective coating may be attached to the surface of the reflective guide wall 44. The reflective guide wall 44 may reflect the light emitted by the phosphor 42.

The reflector 41 may be disposed on the light exit surface 421 of the phosphor 42.

The reflective guide wall 44 may include a top surface 441, a bottom surface 442, and a side surface 443.

The bottom surface 442 of the reflective guide wall 44 may come into contact with the light exit surface 421 of the phosphor 42.

The side surface 443 of the reflective guide wall 44 may be perpendicular to the light exit surface 421 of the phosphor 42.

In some implementations, an anti-reflection film may be formed on the top surface 441 of the reflective guide wall 44 through anti-reflection coating or the like. In some cases, the anti-reflection film may prevent the beam incident on the phosphor assembly 4 from being reflected from the top surface 441 of the reflective guide wall 44.

The reflective guide wall 44 is formed to have a constant height h, which refers to a thickness of the reflector 41. At this time, the thickness h of the reflector 41 may be thicker than a thickness t of the phosphor 42.

At least one space 43 through which the light emitted by the phosphor 42 passes may be formed by the plurality of reflective guide walls 44. The at least one space 43 may be a single space or may be a plurality of spaces.

In some implementations, a cross-section of the space 43 may have a rectangular shape, although implementations are not limited thereto, and the cross-section may be any suitable shape.

The reflector 41 may include a plurality of first reflective guide walls 44a elongated in a first direction being a y-axis direction, and a plurality of second reflective guide walls 44b elongated in a second direction being an x-axis direction perpendicular to y-axis on the light exit surface 421 of the phosphor 42.

The reflector 41 may include N first reflective guide walls 44a (where N is an integer greater than or equal to 2), and may include M second reflective guide walls 44b (where M is an integer greater than or equal to 2).

In the example of FIGS. 3 and 4, the reflector 41 includes two first reflective guide walls 44a and two second reflective guide walls 44b.

In this example, the reflector 41 may form the single space 43 by the four reflective guide walls 44.

One first reflective guide wall among the plurality of first reflective guide walls 44a may be disposed in parallel to the other first reflective guide wall.

One second reflective guide wall among the plurality of second reflective guide walls 44b may be disposed in parallel to the other second reflective guide wall.

Additionally, the first reflective guide wall 44a may be perpendicular to the second reflective guide wall 44b.

One first reflective guide wall among the plurality of first reflective guide walls 44a may be disposed spaced apart from the other first reflective guide wall adjacent thereto by a first spacing interval d1, as shown in the example of FIG. 3.

One second reflective guide wall among the plurality of second reflective guide walls 44b may be disposed spaced apart from another second reflective guide wall adjacent thereto by a second spacing interval d2, also as shown in the example of FIG. 3.

As a result, as shown in the example of FIG. 3, a cross-section of the space 43 formed by the plurality of reflective guide walls 44 may have a rectangular shape, of which a width in the first direction is the first spacing interval d1 and a width in the second direction is the second spacing interval d2.

If a cross-sectional area of a beam incident on the phosphor assembly 4 is larger than the space 43 formed by the plurality of reflective guide walls 44, only a part of the beam incident on the phosphor assembly 4 may be incident on the phosphor 42, and the remaining beam may be blocked or reflected from the top surface 441 of the reflective guide wall 44, thus reducing optical efficiency.

Therefore, in some implementations, the lighting apparatus may be implemented such that the cross-sectional area of the space 43 is wider than the cross-sectional area of the beam incident on the phosphor assembly 4.

For example, if the cross-section of the laser beam incident on the phosphor assembly 4 is circular, then each of the first spacing interval d1 and the second spacing interval d2 may be larger than the diameter of the laser beam.

If the cross-section of the laser beam incident on the phosphor assembly 4 is not circular, then the first spacing interval d1 may be greater than a maximum width of the cross-section of the laser beam in the first direction, and the second spacing interval d2 may be greater than a maximum width of the cross-section of the laser beam in the second direction.

Additionally, since the beam incident on the phosphor assembly 4 may be obliquely incident on the light exit surface 421 of the phosphor 42, a part of the beam incident on the phosphor assembly 4 may be directly incident on the phosphor 42, and a part of the beam incident on the phosphor assembly 4 may be reflected from the side surface of the reflective guide wall 44 and be then incident on the phosphor 42.

However, a part of the beam incident on the phosphor assembly 4 may be blocked or reflected from the top surface 441 of the reflective guide wall 44.

Therefore, in some implementations, the lighting apparatus may be implemented such that the height h of the reflective guide wall 44, that is, the thickness of the reflector 41, is configured by taking into account the incidence angle of the beam incident on the phosphor assembly 4, as well as taking into account the widths d1 and d2 of the space 43 formed by the plurality of reflective guide walls 44 in the first and second directions.

As the incidence angle of the beam incident on the phosphor assembly 4 with respect to the phosphor 42 becomes larger, the height h of the reflective guide wall 44 may be configured to be greater. As the incidence angle of the beam incident on the phosphor assembly 4 with respect to the phosphor 42 becomes smaller, the height h of the reflective guide wall 44 may be configured to be smaller.

However, if the height h of the reflective guide wall 44 is excessively low, then the integrating of light in the space 43 may be reduced, thus losing the yellow-removal effect. If the height h of the reflective guide wall 44 is excessively high, then a distance between the phosphor 42 and the lens 3 may increase, thus causing an increase in the length of the lighting apparatus for the vehicle. Therefore, in some implementations, the height h of the reflective guide wall 44 may be minimized within a range in which the yellow removal effect is maintained.

Hereinafter, the operation of the phosphor assembly 4 will be described.

The blue-based light and the yellow-based light in the phosphor 42 may be reflected toward the light exit surface 421 of the phosphor 42.

Since the light emitted toward the light exit surface 421 of the phosphor 42 is reflected from the side surface 443 of the reflective guide wall 44, the reflective guide wall 44 may guide the emitted light to be integrated in the space 43 formed by the reflective guide wall 44.

As described above, in some scenarios, there may exist a region where the blue-based light is not integrated with the yellow-based light due to a difference of light scattering areas in the phosphor 42, thus causing the yellow ring.

However, according to the present implementation, since the phosphor assembly 4 includes the reflector 41 and the reflective guide walls 44 of the reflector 41 form the space 43 where the blue-based light and the yellow-based light are integrated with each other, the region where the blue-based light is not integrated with the yellow-based light may be reduced. Accordingly, the occurrence of the yellow ring may be minimized.

In some implementations, separately from the reflector 41 provided on the light exit surface 421 of the phosphor 42, the phosphor assembly 4 may further include a reflection member provided on the side surface of the phosphor 42. The reflection member may have a shape of the reflective guide wall 44 and may be integrally formed with the reflector 41.

The reflection member may reflect light leaking out to the side surface of the phosphor 42 toward the inside of the phosphor 42, thereby increasing optical efficiency.

Hereinafter, the operation of the lighting apparatus for the vehicle according to the present implementation will be described.

An example in which the light source 100 emits a blue-based beam and the phosphor assembly 4 performs a wavelength conversion on the blue-based beam to generate a yellow-based beam will be described below.

First, when the light source 100 included in the light source device 1 is turned on, the light source 100 may emit a blue-based beam, and the beam may be emitted toward the rear surface 32 of the lens 3.

The beam incident on the rear surface 32 of the lens 3 may pass through the lens 3, be incident on the reflection unit 2, and be reflected from the reflection unit 2.

The beam reflected from the reflection unit 2 may be reflected toward the optical axis X of the lens 3 by the reflection unit 2 and may be refracted from the rear surface 32 of the lens 3

The beam refracted from the rear surface 32 of the lens 3 may be incident on the phosphor assembly 4.

The beam incident on the phosphor assembly 4 may be incident on the phosphor 42.

A wavelength of the beam incident on the phosphor 42 may be converted by the phosphor 42, and the wavelength-converted beam may be scattered. In the phosphor assembly 4, white-based light may be emitted toward the rear surface 32 of the lens 3 and may be concentrated while passing through the lens 3.

After passing through the front surface 31 of the lens 3, the white-based light may be incident on the projection lens 5 through the rear surface 52 of the projection lens 5.

The white-based light incident on the rear surface 52 of the projection lens 5 may be concentrated by the projection lens 5 and be then emitted in parallel. Such white-based light may be irradiated toward the front of the vehicle.

In some implementations, a heat dissipation member which assists heat dissipation of the phosphor 42 may be disposed in the phosphor 42. The heat dissipation member may include a contact plate which comes into contact with the phosphor 42, and a heat dissipation fin which protrudes from the contact plate.

In a case where the phosphor 42 is a transmissive phosphor, the heat dissipation member may be disposed at a side or an edge of the phosphor 42.

In a case where the phosphor 42 is a reflective phosphor, a light entrance surface and a light exit surface are identical to each other as a front surface. Thus, the contact plate may be attached to the rear surface of the reflection layer to come into surface contact with each other.

Figure 5:
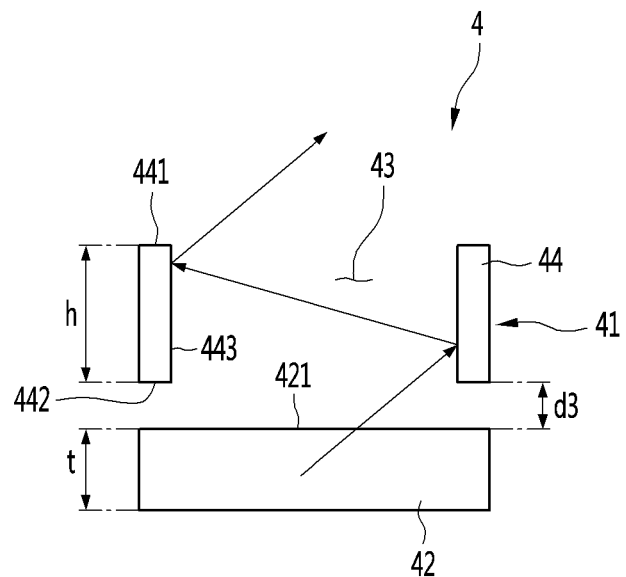
FIG. 5 is a diagram illustrating a cross-sectional view of an example of a phosphor assembly and an example of a path of light emitted by the phosphor assembly according to a second implementation.

FIG. 5 is a cross-sectional view illustrating a phosphor assembly and a path of light emitted by the phosphor assembly according to a second implementation.

The second implementation is substantially identical to the first implementation, except for a position relationship between a reflector 41 and a phosphor 42. Thus, detailed descriptions of the configurations identical or similar to the above-described configurations will be omitted and will focus on different configurations.

Referring to FIG. 5, the reflector 41 may be spaced apart from the phosphor 42. For example, a bottom surface 442 of a reflective guide wall 44 included in the reflector 41 may be spaced apart from a light exit surface 421 of the phosphor 42 by a predetermined interval d3.

In some implementations, the reflector 41 may be spaced apart from the phosphor 42. In some scenarios, such a configuration may help prevent the reflector 41 from being damaged or deformed by heat that is generated during the wavelength conversion process when a laser beam is incident on the phosphor 42.

If the predetermined interval d3 between the bottom surface 442 of the reflective guide wall 44 and the light exit surface 421 of the phosphor 42 is excessively small, the reflector 41 may be damaged or deformed by the heat generated in the phosphor 42. If the predetermined interval d3 is excessively large, yellow-based light may be emitted between the bottom surface 442 of the reflective guide wall 44 and the light exit surface 421 of the phosphor 42, thus deteriorating color purity.

Therefore, in some implementations, the predetermined interval d3 between the bottom surface 442 of the reflective guide wall 44 and the light exit surface 421 of the phosphor 42 may be configured to be minimized within a range in which the reflector 41 is not damaged or deformed by the heat generated in the phosphor 42.

Figure 6:
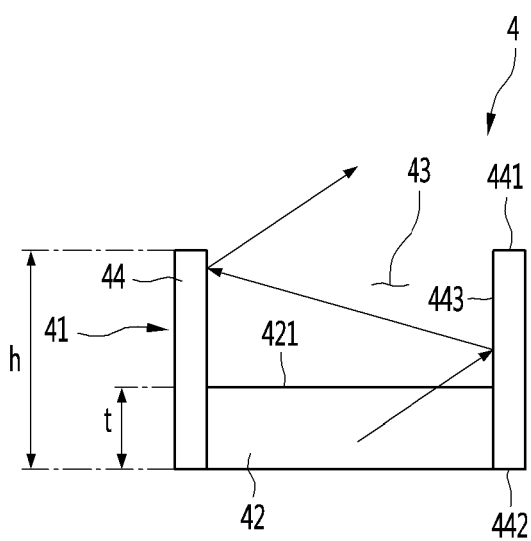
FIG. 6 is a diagram illustrating a cross-sectional view of an example of a phosphor assembly and an example of a path of light emitted by the phosphor assembly according to a third implementation.
Figure 7:
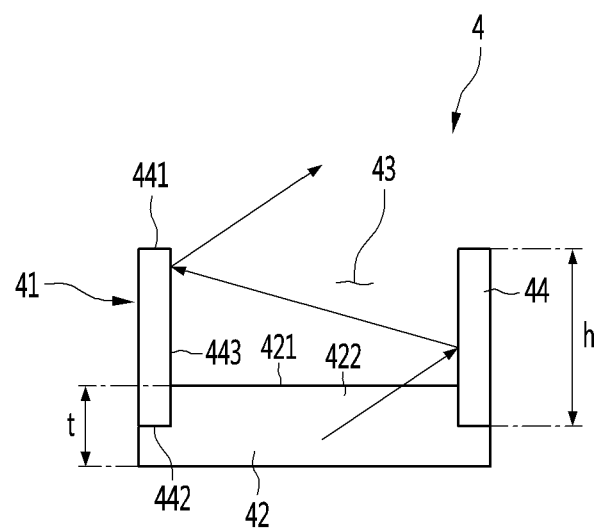
FIG. 7 is a diagram illustrating a cross-sectional view of an example of a phosphor assembly and an example of a path of light emitted by the phosphor assembly according to a fourth implementation.

FIGS. 6 and 7 are respectively cross-sectional views illustrating phosphor assemblies and paths of light emitted by the phosphor assemblies according to third and fourth implementations.

Detailed descriptions of the configurations identical or similar to the above-described configurations will be omitted and will focus on different configurations.

Referring to FIGS. 6 and 7, at least a part of a phosphor 42 may be provided in a space 43 formed by a plurality of reflective guide walls 44.

According to the third implementation, the phosphor 42 may be provided in the space 43. More specifically, a side surface of the phosphor 42 may come into contact with a side surface 443 of a reflective guide wall 44, and a width of the phosphor 42 may correspond to a width of the space 43 formed in a reflector 41.

Since the reflective guide wall 44 comes into contact with the side surface of the phosphor 42, light emitted from the inside of the phosphor 42 to the side surface of the phosphor 42 may be reflected toward the inside of the phosphor 42 by the reflective guide wall 44. Therefore, a separate reflection member may not be provided.

According to the fourth implementation, a part of the phosphor 42 may protrude toward a light exit surface 421 of the phosphor 42 to form a protrusion 422. At this time, the protrusion 422 may be provided in the space 43.

More specifically, a side surface of each protrusion 422 may come into contact with a side surface 443 of the reflective guide wall 44, and an area of the protrusion 422 may correspond to an area of the space 43 formed in the reflector 41.

Figure 8:
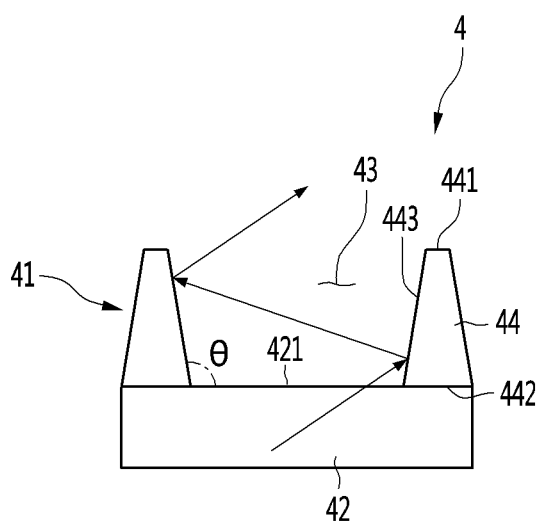
FIG. 8 is a diagram illustrating a cross-sectional view of an example of a phosphor assembly and an example of a path of light emitted by the phosphor assembly according to a fifth implementation.

FIG. 8 is a cross-sectional view illustrating a phosphor assembly and a path of light emitted by the phosphor assembly according to a fifth implementation.

Detailed descriptions of the configurations identical or similar to the above-described configurations will be omitted and will focus on different configurations.

Referring to FIG. 8, a side surface 443 of a reflective guide wall 44 and a light exit surface 421 of a phosphor 42 may form an obtuse angle. For example, an angle θ formed by the side surface 443 of the reflective guide wall 44 and the light exit surface 421 of the phosphor 42 may be greater than 90°.

That is, a cross-section of the reflective guide wall 44 taken along a length direction may have other shapes except for a rectangular shape. For example, the cross-section of the reflective guide wall 44 may have a triangular shape or a trapezoidal shape obtained by cutting an upper end of a triangle.

When the side surface 443 of the reflective guide wall 44 and the light exit surface 421 of the phosphor 42 form the obtuse angle, a cross-sectional area of the space 43 formed in a reflector 41 may increase as the side surface 443 of the reflective guide wall 44 is farther away from the light exit surface 421 of the phosphor 42. Therefore, the emission width of the light emitted by the phosphor assembly 4 may increase and thus the optical efficiency may increase.

When the side surface 443 of the reflective guide wall and the light exit surface 421 of the phosphor 42 form an acute angle, the above-described integrating effect may increase, but the emission width of the light emitted by the phosphor assembly 4 may be reduced and thus the optical efficiency may be reduced.

Figure 9:
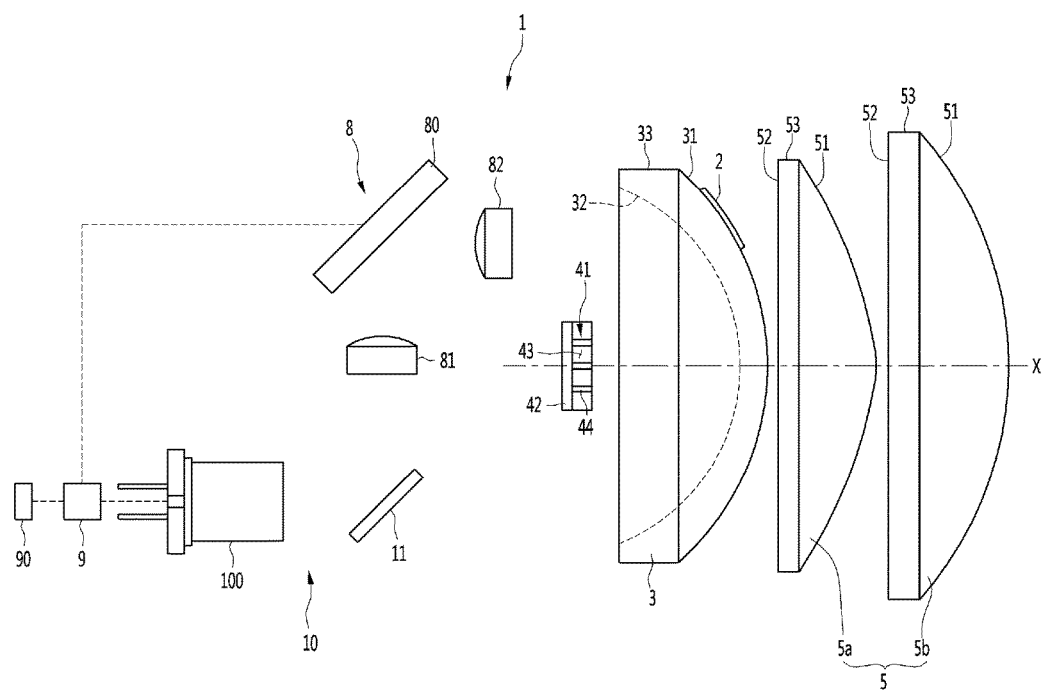
FIG. 9 is a diagram illustrating an example of a lighting apparatus for a vehicle according to a sixth implementation.
Figure 10:
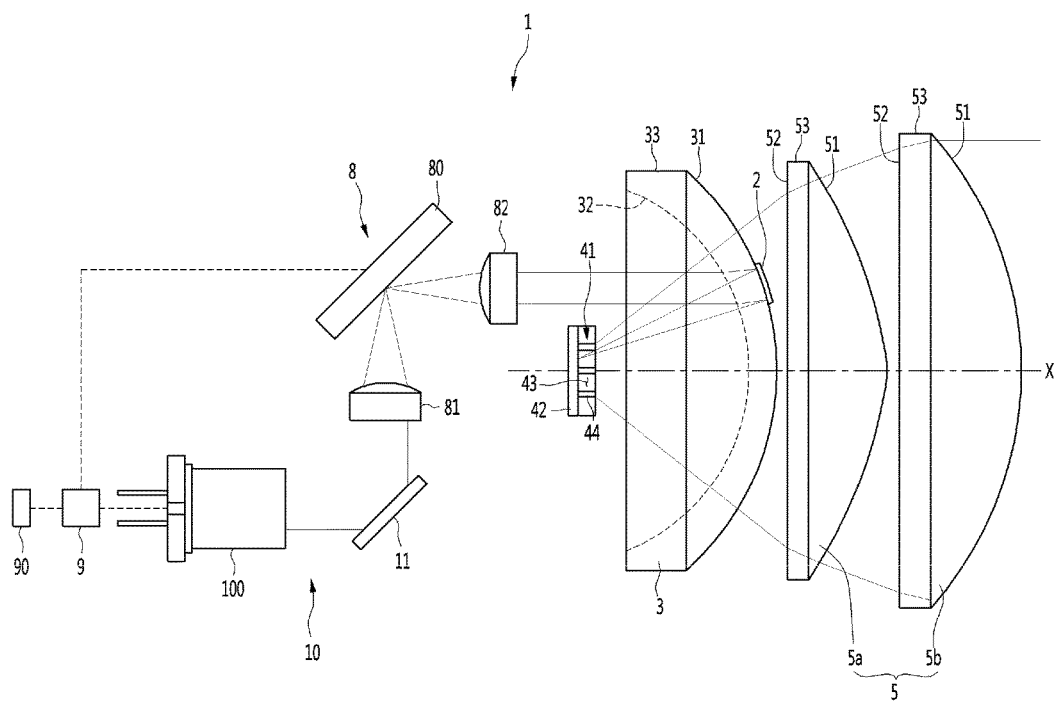
FIG. 10 is a diagram illustrating an example of an optical path of the lighting apparatus for the vehicle according to the sixth implementation.

FIG. 9 is a configuration diagram schematically illustrating a lighting apparatus for a vehicle according to a sixth implementation, and FIG. 10 is a configuration diagram schematically illustrating an optical path of the lighting apparatus for the vehicle according to the sixth implementation.

Detailed descriptions of the configurations identical or similar to the above-described configurations will be omitted and will focus on different configurations.

Referring to FIGS. 9 and 10, a light source device 1 may include a light source unit 10 including a light source 100, and a scanning module 8 which changes and redirects an optical path of a beam emitted by the light source unit 10.

The scanning module 8 may include a scanning unit 80 which changes the optical path of an incident beam by implementing scanning movements at a predetermined frequency and reflecting the incident beam at different angles. The scanning module 8 may also include a first light concentration unit 81 which concentrates the beam emitted by the light source unit 10 and inputs the concentrated beam to the scanning unit 80.

The light source unit 10 may emit the beam toward the scanning module 8, and more specifically, the first light concentration unit 81. The light source unit 10 may emit the beam toward the first light concentration unit 81, and the beam emitted toward the first light concentration unit 81 may be concentrated by the first light concentration unit 81 and be then incident on the scanning unit 80.

The light source unit 10 may emit the beam toward a rear surface of the first light concentration unit 81. In the light source device 1, the beam incident on the rear surface of the first light concentration unit 81 may be concentrated by the first light concentration unit 81 and be then incident on the scanning unit 80.

The light source unit 10 may further include a reflection member 11 which reflects the beam emitted by the light source 100 to change an optical path of the beam.

As an example, the reflection member 11 may be disposed such that an incidence angle of the beam becomes 45 degrees, and may perform a vertical change on the optical path of the beam emitted by the light source 100.

In some implementations, the lighting apparatus may be configured to change a beam emission direction and an arrangement position of the light source 100 according to the arrangement of the reflection member 11, thereby improving compactness of the lighting apparatus for the vehicle.

In a case where the light source unit 10 includes both the light source 100 and the reflection member 11, the optical path of the beam emitted by the light source 100 may be changed in the reflection member 11 and the beam may be reflected toward the first light concentration unit 81. In a case where the light source unit 10 includes the light source 100 and does not include the reflection member 11, the beam emitted by the light source 100 may be emitted toward the first light concentration unit 81.

In a case where the light source unit 10 includes the reflection member 11, the light source 100 may emit the beam in parallel to the optical axis X of the lens 3.

Hereinafter, the scanning module 8 will be described in further detail.

The scanning module 8 may change and redirect the optical path of the beam emitted by the light source unit 10 and emit the beam toward the lens 3.

The scanning module 8 may be disposed behind the lens 3 and may emit the beam toward the rear surface 32 of the lens 3.

The scanning module 8 may include the first light concentration unit 81 and the scanning unit 80. The scanning module 8 may further include a second light concentration unit 82.

The first light concentration unit 81 may concentrate the beam emitted by the light source unit 10 and input the concentrated beam to the scanning unit 80.

When the reflection member 11 is included in the light source unit 10, the optical path of the beam emitted by the light source 100 may be changed by the reflection member 11, and the beam may be reflected toward the first light concentration unit 81, be concentrated by the first light concentration unit 81, and be then incident on the scanning unit 80.

When the reflection member 11 is not included in the light source unit 10, the beam emitted by the light source 100 may be incident on the first light concentration unit 81, be concentrated by the first light concentration unit 81, and be then incident on the scanning unit 80.

The first light concentration unit 81 may be a light reducer which reduces a cross-sectional diameter of the beam emitted by the light source unit 10 and then emits the beam toward the scanning unit 80. When the first light concentration unit 81 is the light reducer, the scanning module 8 may not include the second light concentration unit 82.

The first light concentration unit 81 may be an auxiliary lens which concentrates the beam emitted by the light source unit 10.

If the first light concentration unit 81 is the auxiliary lens, the beam may be concentrated on one point in the scanning unit 80. Thus, the size of the scanning unit 80 may be reduced.

If the first light concentration unit 81 is the auxiliary lens, the beam concentrated in the scanning unit 80 is reflected and scattered from the scanning unit 80. Thus, the second light concentration unit 82 may be implemented so as to concentrate the beam.

The second light concentration unit 82 may concentrate the beam reflected from the scanning unit 80 and emit the beam toward the reflection unit 2.

The second light concentration unit 82 may concentrate the reflected beam, whose optical path is changed by the scanning unit 80, and emit the beam toward the rear surface 32 of the lens 3. The beam may pass through the lens 3 and be then incident on the reflection unit 2.

The second light concentration unit 82 may be disposed between the scanning unit 80 and the lens 3.

Since the reflection unit 2 is provided on the surface disposed on the off-axis deviated from the optical axis of the lens 3, the second light concentration unit 82 which emits the beam toward the reflection unit 2 may be disposed off-axis from the optical axis of the lens 3.

The second light concentration unit 82 may be an auxiliary lens which concentrates the beam reflected from the scanning unit 80. The second light concentration unit 82 may concentrate the beam reflected and scattered from the scanning unit 80, so that the cross-section of the beam has a constant diameter. The beam concentrated and emitted by the second light concentration unit 82 may be incident on the rear surface 32 of the lens 3 and be then reflected from the reflection unit 2.

The optical axis of the first light concentration unit 81 may be perpendicular to the optical axis of the second light concentration unit 82. That is, the optical axis of the first light concentration unit 81 may be perpendicular to the optical axis X of the main lens 3, and the optical axis of the second light concentration unit 82 may be parallel to the optical axis X of the main lens 3.

The scanning unit 80 implements scanning movements according to a predetermined frequency, thereby changing a position of the beam incident on the second light concentration unit 82. Therefore, in order to concentrate the beam, a size of the second light concentration unit 82 may be larger than a size of the first light concentration unit 81.

Hereinafter, an external sensor 90 and a control unit 9 will be described.

The lighting apparatus for the vehicle may further include an external sensor 90 which collects external information of the vehicle, and a control unit 9 which controls the light source device 1, in particular, the light source 100, based on the external information collected by the external sensor 90.

Since the lighting apparatus including a microelectromechanical systems (MEMS) scanner generally constitutes a head lamp of the vehicle, the present case will be described below as an example. However, it is apparent that implementations are not limited thereto.

The external sensor 90 may be a camera. Preferably, the external sensor 90 may be a camera disposed toward the front of the vehicle. The external sensor 90 may collect external information on the front of the vehicle, for example, image information.

The external information collected by the external sensor 90 may include information such as the presence or absence of an oncoming vehicle approaching from the opposite direction in front of the vehicle, a position of the opposing vehicle, a velocity of the opposing vehicle, and the like.

The external information collected by the external sensor 90 may be transmitted to the control unit 9.

The control unit 9 may control the light source device 1 based on the external information collected by the external sensor 90. More specifically, the control unit 9 may control the on-off operations of the light source 100 included in the light source device 1 based on the external information, e.g., information related to an oncoming vehicle.

An incidence position P of light incident on the phosphor assembly 4 may be periodically changed along a predetermined path according to the driving of scanning movements of the scanning unit 80. Details thereof will be described below.

When the incidence position P of the light incident on the phosphor assembly 4 is changed, the position of the light reflected from the phosphor assembly 4 and emitted toward the front of the main lens 3 and the projection lens 5 may also be changed. That is, a direction of the light emitted toward the front of the vehicle may be periodically changed.

When the light emitted toward the front of the vehicle is directed toward a driver of the oncoming vehicle, a glare problem may be caused to the driver of the oncoming vehicle. Thus, there is a risk of accidents.

According to some implementations, the control unit 9 turns off the light source 100 when the light emitted toward the front of the vehicle is directed toward the driver of an oncoming vehicle, and turns on the light source 100 in the other cases. As such, selective emission from the light source 100 based on information regarding oncoming vehicles may help mitigate a glare problem faced by the oncoming vehicles.

When the oncoming vehicle approaches from the front of the vehicle, the external sensor 90 may collect external information and detect the approaching of the oncoming vehicle.

The external information collected by the external sensor 90 may be transmitted to the control unit 9, and the control unit 9 may recognize velocity information and position information of the oncoming vehicle based on the external information.

When the control unit 9 determines that the position of the light emitted toward the front of the vehicle according to the driving of the scanning unit 80 is directed toward the oncoming vehicle, the control unit 9 may turn off the light source 100.

Preferably, when the position of the light emitted toward the front of the vehicle is directed toward the driver of the oncoming vehicle, the control unit 9 may turn off the light source 100.

When the position of the light emitted toward the front of the vehicle according to the driving of the scanning unit 80 is not directed toward the oncoming vehicle recognized by the control unit 9, the control unit 9 may turn on the light source 100.

The control unit 9 may control the scanning operations of the scanning unit 80, which controls the position of the light emitted towards the front of the vehicle. The scanning unit 80 may be driven by any suitable technique. For example, the control unit 9 may control the driving of the scanning unit 80 by controlling an external force applied to the scanning unit 80. As another example, the control unit 9 may control the driving of the scanning unit 80 by controlling a current flowing through a driving coil wound around the scanning unit 80.

In some implementations, the scanning unit 80 may vibrate at a very fast speed. As such, the fast repetitions of scanning movements by the scanning unit 80 may result in the appearance, to a human eye, of a single collective illumination emanating from the front of the vehicle. Additionally, as described above, in a case where the control unit 9 turns off the light source 100 only when the light emitted toward the front of the vehicle is directed toward a specific direction and turns on the light source 100 in the other cases, the driver of the vehicle may recognize as if only a part of the light emitted toward the front of the vehicle is dark.

For example, the control unit 9 may vary the intensity of light in different directions by coordinating control of the light intensity with the scanning movements of the scanning unit 80. As such, the control unit 9 may control the light output intensity in different directions to the front of the vehicle.

Figure 11:
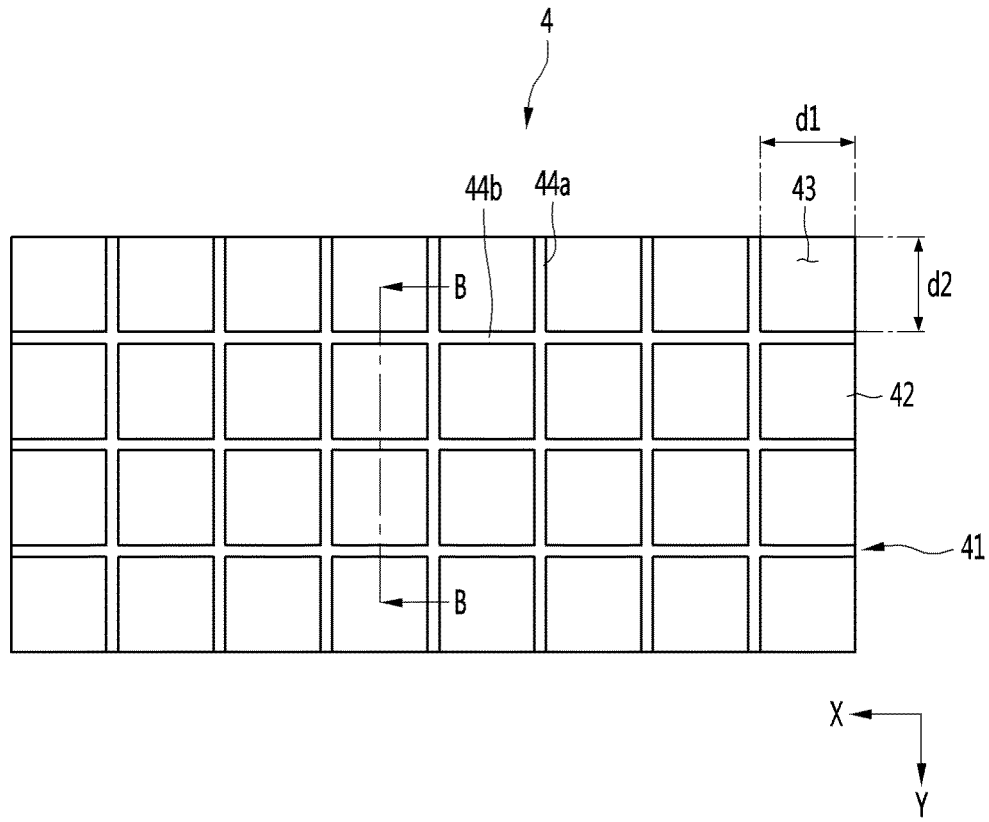
FIG. 11 is a diagram illustrating an example of a phosphor assembly according to the sixth implementation.
Figure 12:
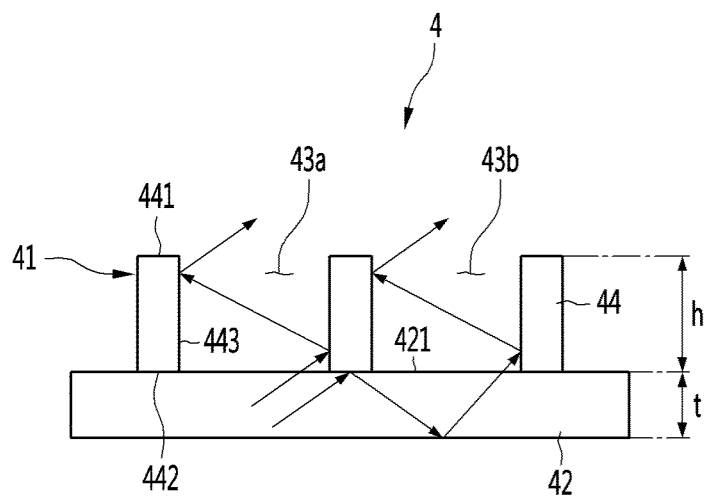
FIG. 12 is a diagram illustrating a cross-sectional view of an example of the phosphor assembly taken along line B-B of FIG. 11 and an example of a path of light emitted by the phosphor assembly.

FIG. 11 is a front view schematically illustrating the phosphor assembly according to the sixth implementation, and FIG. 12 is a cross-sectional view illustrating the phosphor assembly taken along line B-B of FIG. 11 and a path of light emitted by the phosphor assembly.

Detailed descriptions of the configurations identical or similar to the above-described configurations will be omitted and will focus on different configurations.

A plurality of spaces 43 through which the light emitted by the phosphor 42 passes may be formed by a plurality of reflective guide walls 44.

The reflector 41 may include a plurality of reflective guide walls 44a elongated in a first direction being a y-axis direction, and a plurality of second reflective guide walls 44b elongated in a second direction being an x-axis direction perpendicular to y-axis on the light exit surface 421 of the phosphor 42.

The reflector 41 according to the present implementation may include, for example, seven first reflective guide walls 44a and three second reflective guide walls 44b.

In this way, four spaces 43 are formed in the first direction and eight spaces 43 are formed in the second direction. Thus, the reflector 41 satisfies an 8×4 spatial arrangement condition.

The spaces 43 corresponding to edge regions of the phosphor 42 may be opened in the first direction and/or the second direction.

For example, a K-th first reflective guide wall (where K is 1 or N) among N first reflective guide walls 44a may be perpendicular between both ends of the M second reflective guide walls 44b. In this case, one side of the space 43 corresponding to a left edge region of the phosphor 42 may be opened in the second direction, and one side of the space 43 corresponding to a right edge region of the phosphor 42 may be opened in a direction opposite to the second direction.

Similarly, an L-th second reflective guide wall (where L is 1 or M) among the M second reflective guide walls 44b may be perpendicular between both ends of the N first reflective guide walls 44a. In this case, one side of the space 43 corresponding to an upper edge region of the phosphor 42 may be opened in a direction opposite to the first direction, and one side of the space 43 corresponding to a lower edge region of the phosphor 42 may be opened in the first direction.

In contrast, the K-th first reflective guide wall (where K is 1 or N) among the N first reflective guide walls 44a may be perpendicular to the ends of the M second reflective guide wall 44b, and the L-th second reflective guide wall 44b (where L is 1 or M) among the M second reflective guide walls 44b may be perpendicular to the end of the first reflective guide wall 44a. In this case, all the spaces 43 formed in the reflector 41 may be surrounded by the reflective guide walls 44 in the first and second directions, and thus, may not be opened in the first and second directions.

Any one first reflective guide wall 44a among the plurality of first reflective guide walls 44a may be disposed in parallel to another first reflective guide wall 44a.

Any one second reflective guide wall 44b among the plurality of second reflective guide walls 44b may be disposed in parallel to another second reflective guide wall 44b.

Additionally, the first reflective guide wall 44a may be perpendicular to the second reflective guide wall 44b.

Any one first reflective guide wall 44a among the plurality of first reflective guide walls 44a may be disposed spaced apart from another first reflective guide wall 44a adjacent thereto by a first spacing interval d1.

Any one second reflective guide wall 44b among the plurality of second reflective guide walls 44b may be disposed spaced apart from another second reflective guide wall 44b adjacent thereto by a second spacing interval d2.

The beam incident on the phosphor assembly 4 may be incident on the phosphor 42 through one space 43a among the plurality of spaces 43 formed in the reflector 41.

As described above, the beam incident on the phosphor 42 may be scattered and wavelength-converted at the same time and be then reflected from the reflection layer of the phosphor 42 toward the light exit surface 421 of the phosphor 42.

At this time, a part of the light reflected from the reflection layer may be emitted toward the one space 43a through the light exit surface 421 of the phosphor 42, be guided by the reflective guide wall 44, and be integrated in the one space 43a.

A part of the light reflected from the reflection layer of the phosphor 42 may be reflected again from the bottom surface 442 of the reflective guide wall 44 toward the inside of the phosphor 42.

When the phosphor 42 is a reflective phosphor, the light reflected from the bottom surface 442 of the reflective guide wall 44 may be reflected again from the reflection layer of the phosphor 42. The light reflected again from the reflection layer of the phosphor 42 may be emitted toward another space 43b adjacent to the one space 43a through the light exit surface 421 of the phosphor 42. The light emitted from the another space 43b may be guided by the reflective guide wall 44 and be integrated in the another space 43b.

Figure 13:
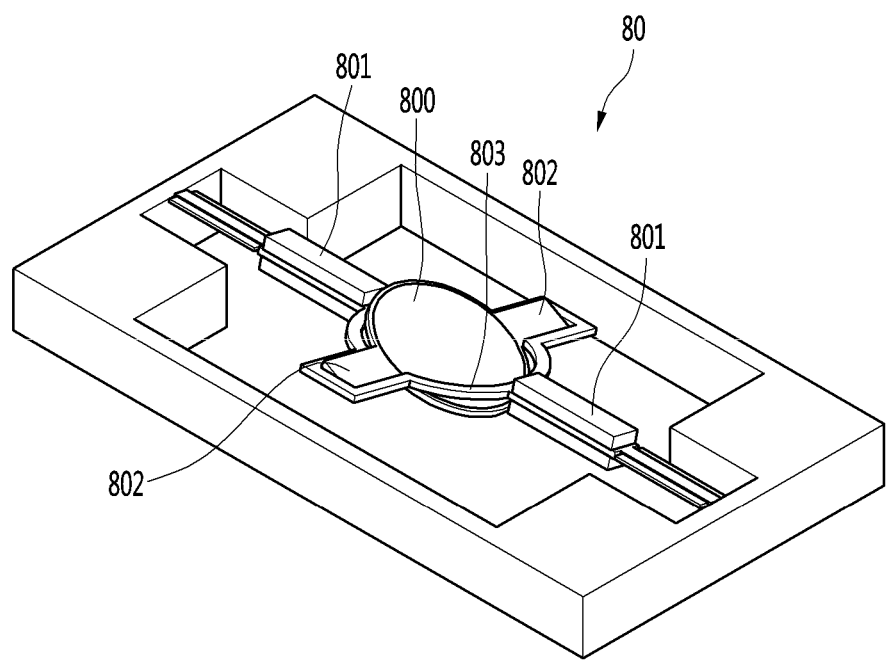
FIG. 13 is a diagram illustrating a perspective view of an example of a scanning unit according to the sixth implementation.

FIG. 13 is a perspective view illustrating the configuration of the scanning unit according to the sixth implementation.

The scanning unit 80 may be, for example, a micro-electro-mechanical system (MEMS) scanner. The scanning unit 80 may have a structure that is resonated by an external force and may be vibrated in a seesaw-type motion to repeatedly scan a particular pattern of light.

Due to the scanning unit 80, the lighting apparatus for the vehicle according to the present implementation may implement a scanning function that scans a particular pattern of output light.

The scanning unit 80 may be driven by any suitable technique. For example a device which generates air flow, such as an ultrasonic device, may be provided around the scanning unit 80, and the scanning unit 80 may be driven by the air flow generated by the device.

A driving coil may be wound around the scanning unit 80, and a magnet pair which generates a magnetic field may be disposed around the scanning unit 80. The scanning unit 80 may be driven by a rotational moment generated according to a current flowing through the coil and the magnetic field of the magnet pair.

The scanning unit 80 may be a 2-shaft driven MEMS scanner which oscillates with respect to two shafts perpendicular to each other. The 2-axis drive type scanner may generate a two-dimensional scanning pattern by independently controlling rotation of the two axes.

The scanning unit 80 may include a mirror unit 800, a first driving shaft 801, a second driving shaft 802, and a driving member 803. More specifically, the scanning unit 80 may include the first driving shaft 801 which is rotatable, the driving member 803 to which the first driving shaft 801 is connected at the outside thereof, the second driving shaft 802 which is rotatably connected to the inside of the driving member 803, and the mirror unit 800 which is connected to the second driving shaft 802.

The mirror unit 800 may reflect incident light. The mirror unit 800 may be a circular or polygonal mirror. The mirror unit 800 may be connected to the second driving shaft 802.

The mirror unit 800 and the second driving shaft 802 may be disposed inside the driving member 803. More specifically, the second driving shaft 802 may be rotatably connected to the inside of the driving member 803, and the mirror unit 800 may be connected to the second driving shaft 802.

The first driving shaft 801 may be connected to the outside of the driving member 803.

The first driving shaft 801 and/or the second driving shaft 802 may be elastic members which are configured to undergo torsional deformation, so as to elastically support the rotating driving member 803.

The first driving shaft 801 and/or the second driving shaft 802 may be rotatable rigid bodies having separate rotational shafts.

The first driving shaft 801 may be connected to the outside of the driving member 803. The first driving shaft 801 may rotate with respect to a length direction of the first driving shaft 801.

The second driving shaft 802 may be connected to the inside of the driving member 803 and the mirror unit 800. The second driving shaft 802 may rotate with respect to a length direction of the second driving shaft 802. The second driving shaft 802 may rotate independently of the driving member 803.

The driving member 803 may be supported by the first driving shaft 801 and may rotate together according to the rotation of the first driving shaft 801. Thus, the driving member 803 may rotate about the longitudinal direction of the first driving shaft 801.

The mirror unit 800 may be supported by the second driving shaft 802 and may rotate together according to the rotation of the second driving shaft 802. The first driving shaft 801 and the second driving shaft 802 may be perpendicular to each other and may independently rotate. Consequently, the second driving shaft 802 connected to the driving member rotating with respect to the length direction of the first driving shaft 801 may rotate. Therefore, the mirror unit 800 may be 2-shaft-driven with respect to the first driving shaft 801 and the second driving shaft 802 perpendicular to each other. Since the mirror unit 800 is driven by an external force based on a predetermined frequency, the mirror unit 800 may rotate according to the predetermined frequency.

The scanning unit 80 may be independently driven with respect to two shafts. In some implementations, the second driving shaft 802 may rotate without oscillation, and the first driving shaft 801 may rotate while oscillating according to a predetermined frequency. By contrast, in some implementations, the first driving shaft 801 may rotate without oscillation, and the second driving shaft 802 may rotate while oscillating according to a predetermined frequency.

The scanning unit 80 may change an optical path by reflecting incident light while moving according to a predetermined frequency. The scanning unit 80 may convert the optical path by reflecting light concentrated by the first light concentration unit 81 and input the light to the second light concentration unit 82.

More specifically, the light incident on the scanning unit 80 may be reflected by the mirror unit 800. The mirror unit 800 may be driven with respect to two shafts perpendicular to each other and convert the optical path by reflecting light incident on the mirror unit 800.

The light, which is reflected due to the change of the optical path by the scanning unit 80, may be concentrated by the second light concentration unit 82, be incident on the rear surface 32 of the lens 3, pass through the lens 3, be reflected from the reflection unit 2, and be then incident on the phosphor assembly 4.

Figure 14:
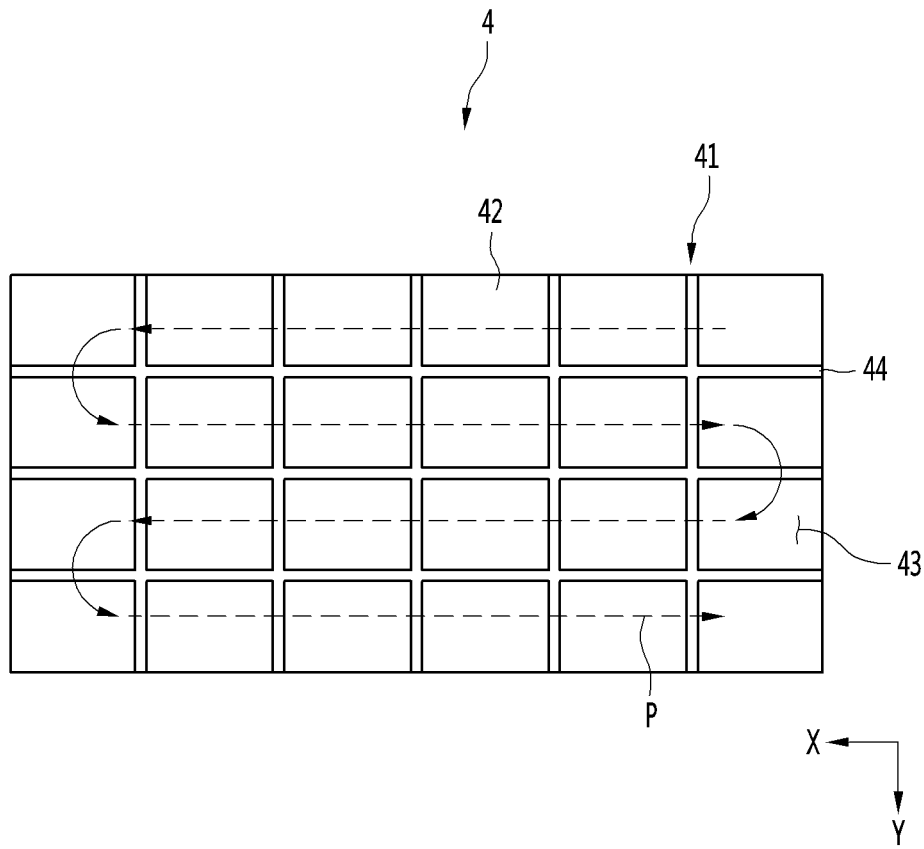
FIG. 14 is a diagram illustrating an example of a path change of an incidence position at which a beam is incident on the phosphor assembly according to the sixth implementation.
Figure 15:
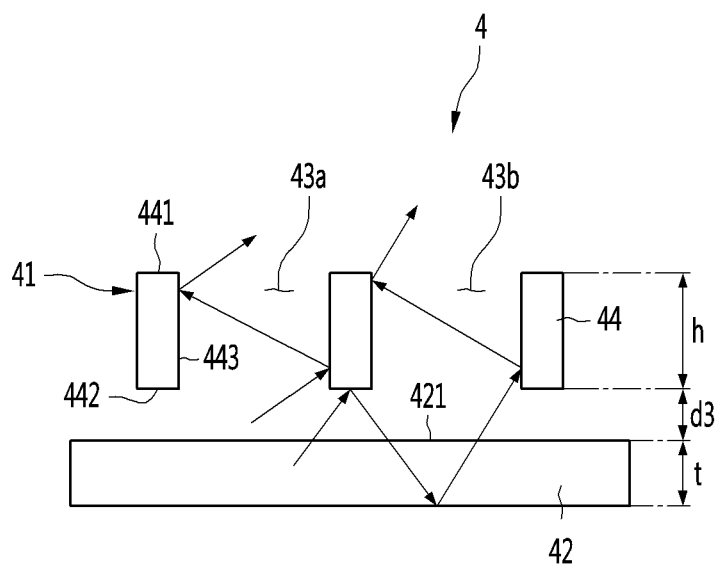
FIG. 15 is a diagram illustrating a cross-sectional view of an example of a phosphor assembly and an example of a path of light emitted by the phosphor assembly according to a seventh implementation.

FIG. 14 is a schematic view illustrating a path change of an incidence position at which light is incident on the phosphor assembly according to the sixth implementation.

Hereinafter, the path change of the position at which the light reflected from the mirror unit 800 according to the driving of the scanning unit 80, in particular, the mirror unit 800, is incident on the phosphor assembly 4 will be described with reference to FIG. 14.

Since the scanning unit 80 may be driven with respect to each of two shafts perpendicular to each other, the path change of the incidence position P of the beam emitted by the scanning module 8 with respect to the phosphor assembly 4 will be separately described with reference to the first direction being the y-axis direction and the second direction being the x-axis direction.

The incidence position P of the beam incident on the phosphor assembly 4 may be moved in the first direction according to the rotation of the first driving shaft 801, and the incidence position P of the beam incident on the phosphor assembly 4 may be moved in the second direction according to the rotation of the second driving shaft 802.

Additionally, as described above, the first driving shaft 801 may rotate without oscillation, and the second driving shaft 802 may rotate while oscillating according to a predetermined frequency. Hereinafter, a case where the first driving shaft 801 rotates without oscillation and the second driving shaft 802 rotates while oscillating according to a predetermined frequency will be described as an example.

First, as shown in FIG. 14, the beam reflected from the mirror unit 800 may be incident on the right upper region of the phosphor assembly 4. The second driving shaft 802 may rotate in one direction, and thus, the incidence position P of the beam incident on the phosphor assembly 4 may be moved in the second direction. The first driving shaft 801 does not rotate, and therefore the incidence position P of the beam is not moved in the first direction or the direction opposite to the first direction during this portion.

When the incidence position P of the beam reaches the left region of the phosphor assembly 4, the first driving shaft 801 may rotate, and thus, the incidence position P of the beam incident on the phosphor assembly 4 may be moved in the first direction. The second driving shaft 802 may rotate in the other direction opposite to the one direction in which the second driving shaft 802 has rotated up to now, and thus, the incidence position P of the beam may be moved in the direction opposite to the second direction, as indicated by the curved portion in the upper left hand side of FIG. 14.

When the incidence position P of the beam is moved from the phosphor assembly 4 in the first direction by a predetermined distance, the first driving shaft 801 stops rotating and the second driving shaft 802 continuously rotates in the other direction. Therefore, the incidence position P of the beam incident on the phosphor assembly 4 may be moved in the direction opposite to the second direction, but does not move in the first direction or the direction opposite to the first direction.

Still referring to FIG. 14, when the incidence position P of the beam reaches the right region of the phosphor assembly 4, the stopped first driving shaft 801 may rotate again in the same direction, and thus, the incidence position P of the beam incident on the phosphor assembly 4 may be moved in the first direction. The second drive shaft 802 flips its rotation direction again, and begins rotating in the one direction opposite to the other direction in which the second driving shaft 802 has rotate up to now, and thus, the incidence position P of the beam may be moved in the second direction, as indicated by the curved portion in the right hand side of FIG. 14.

Still referring to FIG. 14, when the incidence position P of the beam is moved from the phosphor assembly 4 in the first direction by a predetermined distance, the first driving shaft 801 stops rotating and the second driving shaft 802 continuously rotates in the one direction. Therefore, the incidence position P of the beam incident on the phosphor assembly 4 may be moved in the second direction, but does not move in the first direction or the direction opposite to the first direction.

As such, according to the implementation described above, the first driving shaft 801 repeatedly alternates between slightly rotating by a fixed amount, stopping, slightly rotating again by a fixed amount, stopping, etc., repeating this alternating start-and-stop movement in the same direction. The second driving shaft 802 continuously rotates in an alternating back-and-forth manner according to a predetermined frequency. Therefore, the first driving shaft 801 may continuously rotate in the same direction, and the second driving shaft 802 may periodically repeat the rotation in the one direction and the other direction.

As a result of this periodic motion of both the first and second drive shafts 801 and 802, the incidence position P of the beam incident on the phosphor assembly 4 follows a movement pattern that continuously reciprocates in the left and right end regions of the phosphor assembly 4 while slightly moving downward in the left and right end regions of the phosphor assembly 4, as illustrated in FIG. 14.

By repeating the above driving two or more times, the beam incident on the phosphor assembly 4 may reach the right lower end region of the phosphor assembly 4. At this time, the first driving shaft 801 may rotate in the direction opposite to the first direction, and the incidence position P of the beam incident on the phosphor assembly 4 may return back to the original position. After that, the above-described processes may be repeated from the beginning to re-trace the movement pattern shown in FIG. 14.

In order to stably reflect the incident beam, the phosphor assembly 4 may be larger than a range including the above-described moving path of the incidence position P of the beam.

By continuously re-tracing the pattern shown in FIG. 14, the scanning unit 80 covers substantially the entire phosphor assembly 4 with a path of the incident light. The incident light is then reflected from the phosphor assembly 4 and is emitted out from the front of the vehicle. As such, the movement pattern of incident light generated by the scanning unit 80 shown in FIG. 14 controls the light emission pattern out of the front of the vehicle.

The scanning unit 80 may vibrate and rotate at a very fast speed, resulting in fast repetitions of the movement pattern shown in FIG. 14. As such, the fast repetitions of the light pattern shown in FIG. 14 may result in the appearance, to a human eye, of a single collective illumination emanating from the front of the vehicle.

The above description and the specific pattern of incident light movement shown in FIG. 14 are provided for illustrative purposes, and implementations are not limited thereto. The moving path of the incidence position P of the beam incident on the phosphor assembly 4 may be changed according to a method of driving the first driving shaft 801 and the second driving shaft 802. For example, the respective periodic movements of the first and second drive shafts 801 and 802 may be exchanged, resulting in a movement pattern that is a ninety-degree rotation of that shown in FIG. 14.

Using a movement pattern of incident position P of the beam incident on the phosphor assembly 4, such as the one shown in FIG. 14, the control unit 9 may perform adaptive control of light emitted from the front of the vehicle. For example, the control unit 9 may vary the intensity of light in different portions of the light movement path of FIG. 14 by coordinating control of the light intensity with the rotation of the scanning unit 80. This results in varying intensities in different areas of the light emitted from the front of the vehicle.

As a specific example, consider an example where the control unit 9 coordinates control of light source intensity with control of the scanning unit 80 so as to reduce the intensity of the light source whenever the scanning unit 80 reaches the first curved portion in the upper-left side of the movement path in FIG. 14. In this scenario, the resulting effect on light emitted from the front of the vehicle is to selectively reduce the intensity of light emitted from the headlamp in a specific direction, namely to reduce the intensity of light that is emitted towards a specific direction ahead of the vehicle, while maintaining the intensity of light in other directions ahead of the vehicle.

As such, the control unit 9 may selectively control the intensity of light that is illuminated from the front of the vehicle to illuminate different areas ahead of the vehicle with different intensities. Such selective directional illumination control may be based on external information that is collected from around the vehicle.

In some implementations, the control unit 9 may turn off the light source 100 when the beam incident on the phosphor assembly 4 is incident on the top surface 441 of the reflective guide wall 44, and may turn on the light source 100 when the beam incident on the phosphor assembly 4 is incident on the phosphor 42.

As described above, the incidence position P of the beam incident on the phosphor assembly 4 is moved along a predetermined path, and a part of the beam may be incident on not the phosphor 42 but the top surface 441 of the reflective guide wall 44 in such a moving process.

When the beam incident on the phosphor assembly 4 is incident on the top surface 441 of the reflective guide wall 44, the beam may be reflected from the top surface 441 of the reflective guide wall 44, causing a noise and deteriorating color purity of light emitted by the phosphor assembly 4.

In order to mitigate this problem, the control unit 9 may turn off the light source 100 when the beam incident on the phosphor assembly 4 is incident on the top surface 441 of the reflective guide wall 44 while the incidence position P of the beam is moved, and may turn on the light source 100 when the beam incident on the phosphor assembly 4 is incident on the phosphor 42.

In this way, the entire beam incident on the phosphor assembly 4 is incident on the phosphor 42, thereby improving color purity of the light emitted by the phosphor assembly 4.

FIGS. 15 to 18 are cross-sectional views illustrating phosphor assemblies and paths of light emitted by the phosphor assemblies according to seventh to tenth implementations of the present disclosure.

The phosphor assemblies 4 according to the seventh to tenth implementations are identical to the phosphor assemblies 4 according to the second to fifth implementations in terms of the position relationship between the phosphor 42 and the reflector 41 and the shape of the reflective guide wall 44. Additionally, a configuration in which a plurality of spaces 43 are formed by the reflector 41 is identical to the configuration of the phosphor assembly 4 according to the sixth implementation. Thus, detailed descriptions of the configurations identical or similar to the above-described configurations will be omitted and will focus on different configurations.

Figure 16:
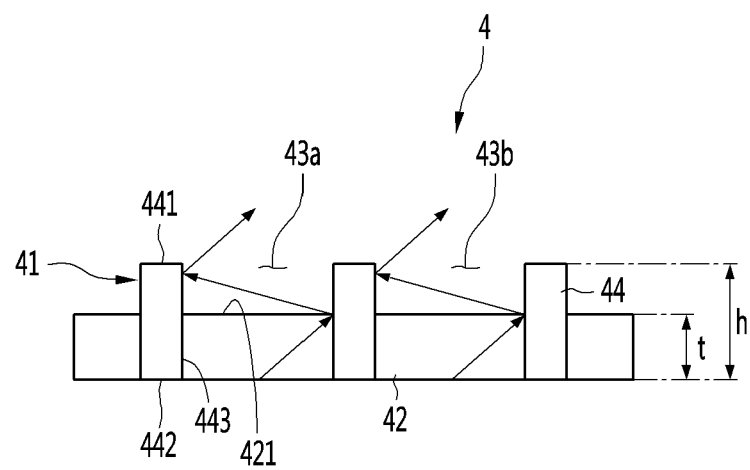
FIG. 16 is a diagram illustrating a cross-sectional view of an example of a phosphor assembly and an example of a path of light emitted by the phosphor assembly according to an eighth implementation.
Figure 17:
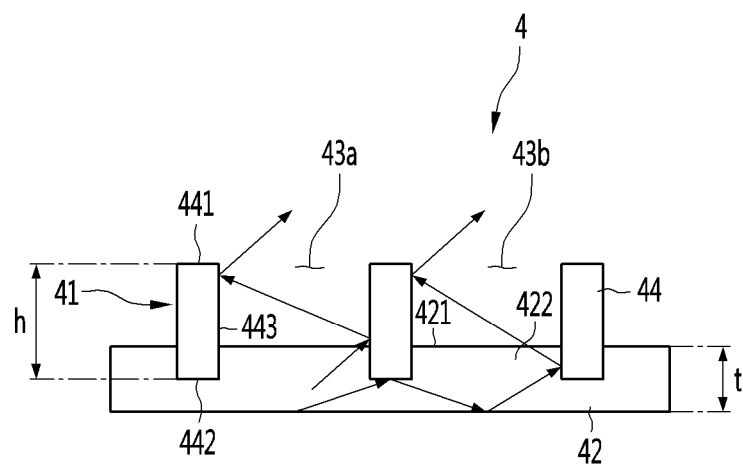
FIG. 17 is a diagram illustrating a cross-sectional view of an example of a phosphor assembly and an example of a path of light emitted by the phosphor assembly according to a ninth implementation.
Figure 18:
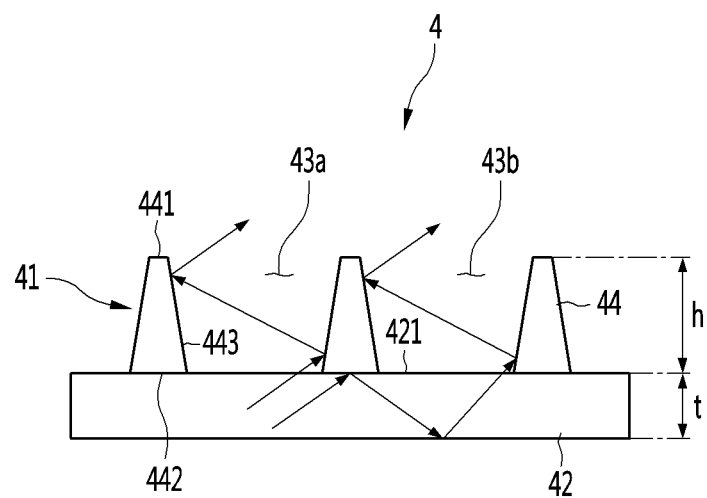
FIG. 18 is a diagram illustrating a cross-sectional view of an example of a phosphor assembly and an example of a path of light emitted by the phosphor assembly according to a tenth implementation.

Referring to FIG. 16, the phosphor assembly 4 according to the eighth implementation may include a plurality of phosphors 42. More specifically, the plurality of phosphors 42 may be respectively provided in a plurality of spaces 43 formed in the reflector 41 by a plurality of reflective guide walls 44.

The number of the plurality of phosphors 42 and the area of each of the phosphors 42 may correspond to the number of the plurality of spaces 43 and the area of each of the spaces 43.

As described above, the beam incident on the phosphor assembly 4 may be incident on the phosphor 42 through one space 43a among the plurality of spaces 43 formed in the reflector 41 and be then wavelength-converted. The light reflected from the reflection layer of the phosphor 42 may be emitted toward the one space 43a through the light exit surface 421 of the phosphor 42, be guided by the reflective guide wall 44, and be integrated in the one space 43a.

However, since the light reflected from the reflection layer of the phosphor 42 cannot be reflected from the bottom surface 442 of the reflective guide wall 44, the beam cannot be emitted toward another space 43b adjacent to the one space 43a.

Figure 19:
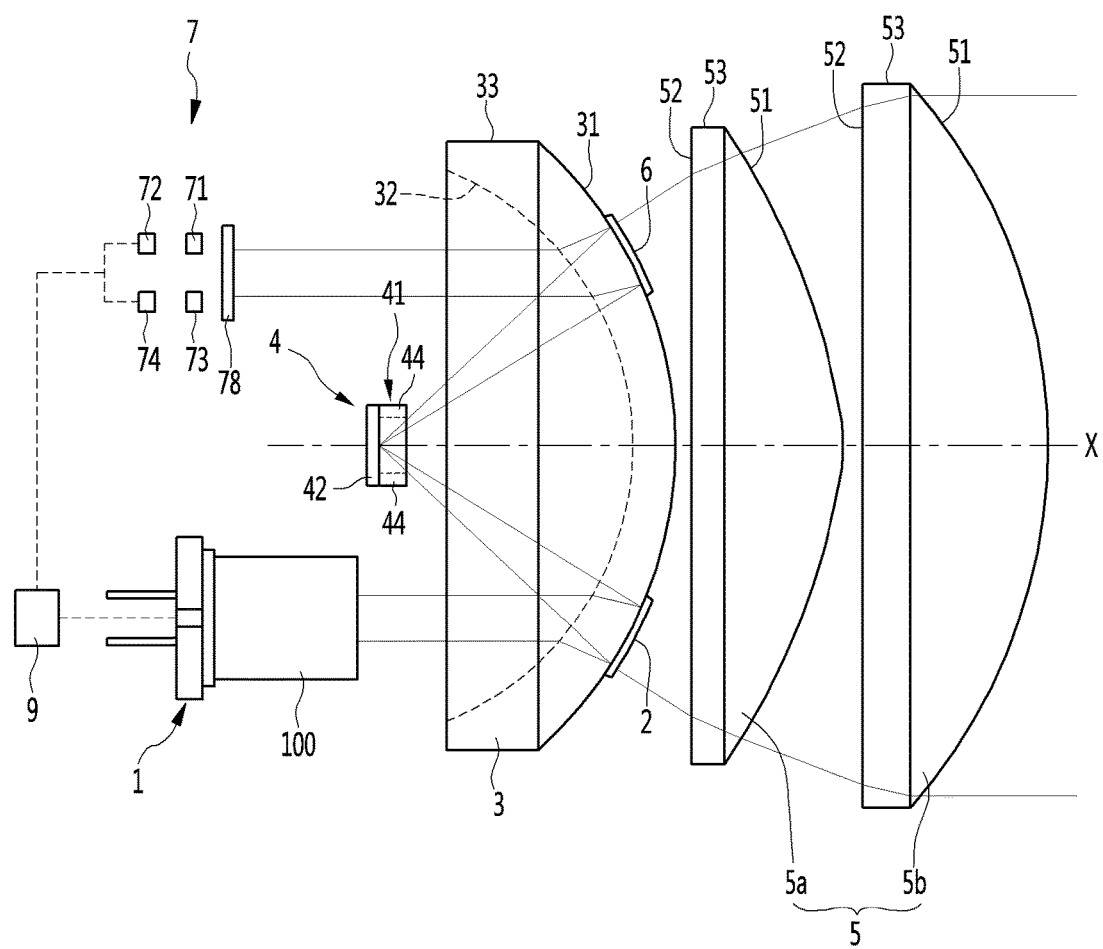
FIG. 19 is a diagram illustrating an example of a lighting apparatus for a vehicle and an example of an optical path according to the eleventh implementation.

FIG. 19 is a configuration diagram schematically illustrating a lighting apparatus for a vehicle and an optical path according to an eleventh implementation.

The lighting apparatus for the vehicle according to the present implementation is substantially identical to the lighting apparatus for the vehicle according to the first implementation, except for an auxiliary reflection unit 6, a sensing unit 7, and a control unit 9. Thus, detailed descriptions of the configurations identical or similar to the above-described configurations will be omitted and will focus on different configurations.

Referring to FIG. 19, the lighting apparatus for the vehicle may further include the auxiliary reflection unit 6 which reflects a part of light reflected to a main lens 3 by a phosphor assembly 4 toward the rear of the main lens 3.

Additionally, the sensing unit 7 may be disposed behind the auxiliary reflection unit 6. Details thereof will be described below.

Hereinafter, the auxiliary reflection unit 6 will be described.

The auxiliary reflection unit 6 may be provided in a partial region of the surface of the lens 3.

Although the auxiliary reflection unit 6 may be connected to the reflection unit 2 to constitute a single reflection unit, it is preferable that the auxiliary reflection unit 6 is disposed spaced apart from the reflection unit 2 on a front surface 31 or a rear surface 32 of the lens 3 so as to sufficiently ensure a light exit region of the lens 3.

The reflection unit 2 and the auxiliary reflection unit 6 may be disposed so as to be symmetrical to each other with respect to an optical axis of the lens 3.

The reflection unit 2 and the auxiliary reflection unit 6 may be disposed on the front surface 31 of the lens 3 so as to be symmetrical to each other with a 180° phase difference.

In a case where the reflection unit 2 is formed in a left region of the front surface 31 of the lens 3, the auxiliary reflection unit 6 may be formed in a right region of the front surface 31 of the lens 3.

In a case where the reflection unit 2 is formed in an upper region of the front surface 31 of the lens 3, the auxiliary reflection unit 6 may be formed in a lower region of the front surface 31 of the lens 3.

The reflection unit 2 and the auxiliary reflection unit 6 may be disposed at the same distance from the optical axis X of the lens 3, or may be disposed at different distances from the optical axis X of the lens 3.

On the surface of the lens 3, a curvature of a region where the reflection unit 2 may be equal to a curvature of a region where the auxiliary reflection unit 6 is attached.

Each of the reflection unit 2 and the auxiliary reflection unit 6 may include an anti-reflection coating layer coated on the front surface 31 of the lens 3 except for the optical axis X of the lens 3, or may include a reflection sheet attached on the front surface 31 of the lens 3 except for the optical axis X of the lens 3.

The reflection unit 2 provided on the front surface 31 of the lens 3 may reflect the beam emitted by the light source device 1 and passing through the lens 3 toward the phosphor assembly 4. The light emitted by the phosphor assembly 4 may pass through the lens 3. A part of the light emitted toward the lens 3 by the phosphor assembly 4 may be incident on the auxiliary reflection unit 6.

The light incident on the auxiliary reflection unit 6 by the phosphor assembly 4 may be reflected toward the rear of the lens 3 by the auxiliary reflection unit 6.

The light reflected toward the rear of the lens 3 by the auxiliary reflection unit 6 may pass through the rear surface 32 of the lens 3, and this light may be emitted toward the rear of the main lens 3.

Hereinafter, the sensing unit 7 will be described.

According to the present implementation, the lighting apparatus for the vehicle may further include the sensing unit 7 which senses the light reflected toward the rear of the lens 3 by the auxiliary reflection unit 6, and the control unit 9 may control a light source 100 according to a sensing value of the sensing unit 7.

The sensing unit 7 may be disposed behind the lens 3.

The sensing unit 7 may be disposed outside the optical axis X of the lens 3.

The sensing unit 7 may be disposed behind the region where the auxiliary reflection unit 6 is attached.

The sensing unit 7 may include a first filter 71 through which blue-based light passes, a first light sensor 72 which senses light passing through the first filter 71, a second filter 73 which blocks the blue-based light, and a second light sensor 74 which senses the light passing through the second filter 73.

Preferably, the sensing unit 7 may further include a third filter 78 disposed in front of the first filter 71 and the second filter 73 to sensitize the light directed toward the first filter 71 and the second filter 73.

The control unit 9 may turn off the light source 100 when light exceeding a reference value is sensed by the first light sensor 72. The control unit 9 may turn off the light source 100 when light less than or equal to the reference value is sensed by the second light sensor 74 or no light is sensed by the second light sensor 74.

A case where the light exceeding the reference value is sensed by the first light sensor 72 may indicate that the phosphor assembly 4 does not convert the blue-based light into white-based light. In this case, the light source 100 may be turned off so that the blue-based light is not emitted toward the front of the vehicle.

Additionally, a case where the light less than or equal to the reference value is sensed by the second light sensor or no light is sensed by the second light sensor 74 may indicate that the phosphor assembly 4 does not properly function. In this case, the light source 100 may be turned off so that the blue-based light is not emitted toward the front of the vehicle.

The above descriptions are only for illustrative purposes, and it will be apparent to those skilled in the art that various modifications and changes may be made thereto without departing from the scope of the present disclosure.

Therefore, the implementations set forth above are not intended to limit the technical spirit of the present disclosure, and the scope of the present disclosure is not limited by these implementations.

The scope of the present disclosure should be defined by the appended claims, and all technical spirits within the equivalent range will be construed as being included in the scope of the present disclosure.

What is claimed is:

1. A lighting apparatus for a vehicle, comprising:
   a lens;
   a reflection unit;
   a light source device disposed behind the lens, wherein the light source device is configured to emit a beam toward the lens;

a phosphor assembly configured to convert a wavelength of an incident beam and to emit light having the converted wavelength toward the lens, an auxiliary reflection unit disposed apart from the reflection unit;

a sensing unit configured to sense light that is emitted by the phosphor assembly and reflected by the auxiliary reflection unit; and a controller configured to control the light source device based on information sensed by the sensing unit, wherein the phosphor assembly comprises:

a phosphor configured to emit the light having the converted wavelength of the incident beam; and a reflector comprising a plurality of reflective guide walls configured to reflect the light having the converted wavelength emitted by the phosphor, wherein the reflector comprising the plurality of reflective guide walls defines at least one space through which the light having the converted wavelength emitted by the phosphor is guided by the plurality of reflective guide walls, and wherein the reflection unit is disposed between an optical axis of the lens and a peripheral surface of the lens.

2. The lighting apparatus of claim 1, wherein at least a portion of the phosphor is provided in the at least one space defined by the reflector comprising the plurality of reflective guide walls.

3. The lighting apparatus of claim 1, wherein the reflector is provided on a light exit surface of the phosphor.

4. The lighting apparatus of claim 1, wherein the reflector is disposed at a position between the phosphor and the lens.

5. The lighting apparatus of claim 1, wherein a thickness of the reflector is greater than a thickness of the phosphor.

6. The lighting apparatus of claim 1, wherein a side surface of the plurality of reflective guide walls is perpendicular to a light exit surface of the phosphor.

7. The lighting apparatus of claim 1, wherein a side surface of the plurality of reflective guide walls and a light exit surface of the phosphor form an obtuse angle.

8. The lighting apparatus of claim 1, wherein a cross-sectional area of the at least one space defined by the reflector is greater than a cross-sectional area of the incident beam on the phosphor assembly.

9. The lighting apparatus of claim 1, wherein the light source device comprises:

a light source unit comprising a light source; and a scanning module configured to redirect an optical path of a beam emitted by the light source unit, the scanning module comprising:

a scanning unit configured to redirect the optical path by reflecting an incident beam while performing scanning movements according to a predetermined frequency; and a light concentration unit configured to concentrate the beam emitted by the light source unit and to input the beam into the scanning unit.

10. The lighting apparatus of claim 9, further comprising:

an external sensor configured to sense external information outside the vehicle; and a control unit configured to control the light source based on the external information.

11. The lighting apparatus of claim 10, wherein the control unit is configured to:

turn off the light source based on the beam that is incident on the phosphor assembly being incident on a top surface of the plurality of reflective guide walls; and turn on the light source based on the beam that is incident on the phosphor assembly being incident on the phosphor of the phosphor assembly.

12. The lighting apparatus of claim 9, wherein the phosphor is a reflective phosphor in which a light entrance surface is identical to a light exit surface.

13. The lighting apparatus of claim 12, wherein the phosphor assembly is disposed behind the lens.

14. The lighting apparatus of claim 1, wherein a cross-section of the at least one space defined by the reflector has a rectangular shape.

15. The lighting apparatus of claim 1, wherein an anti-reflection film is formed on a top surface of the plurality of reflective guide walls.

16. The lighting apparatus of claim 1, wherein the reflector is disposed at a position that is spaced apart from the phosphor.

17. The lighting apparatus of claim 1, wherein the reflector comprises:

a plurality of first reflective guide walls elongated in a first direction; and a plurality of second reflective guide walls elongated in a second direction perpendicular to the first direction.

18. The lighting apparatus of claim 17, wherein one first reflective guide wall among the plurality of first reflective guide walls is disposed in parallel to another first reflective guide wall among the plurality of first reflective guide walls, and one second reflective guide wall among the plurality of second reflective guide walls is disposed in parallel to another second reflective guide wall among the plurality of second reflective guide walls.

19. The lighting apparatus of claim 17, wherein one first reflective guide wall among the plurality of first reflective guide walls is disposed to be spaced apart from another first reflective guide wall that is adjacent to the one first reflective guide wall by a first spacing interval, and one second reflective guide wall among the plurality of second reflective guide walls is disposed to be spaced apart from another second reflective guide wall adjacent to the one second reflective guide wall by a second spacing interval.

20. The lighting apparatus of claim 19, wherein a width of the first spacing interval is greater than a maximum width, in the first direction, of a cross-section of the beam that is incident on the phosphor assembly, and the second spacing interval is greater than a maximum width, in the second direction, of the cross-section of the beam that is incident on the phosphor assembly.

* * * * *